US009847801B1

(12) United States Patent
Iannacci

(10) Patent No.: US 9,847,801 B1
(45) Date of Patent: Dec. 19, 2017

(54) WIDEBAND POWER ATTENUATORS IN RF-MEMS TECHNOLOGY

(71) Applicant: Fondazione Bruno Kessler, Trento (IT)

(72) Inventor: Jacopo Iannacci, Bologna (IT)

(73) Assignee: Fondazione Bruno Kessler, Trento (IT)

( * ) Notice: Subject to any disclaimer, the term of this patent is extended or adjusted under 35 U.S.C. 154(b) by 0 days.

(21) Appl. No.: 15/497,662

(22) Filed: Apr. 26, 2017

(51) Int. Cl.
*H04B 1/04* (2006.01)
*B81B 3/00* (2006.01)

(52) U.S. Cl.
CPC ......... *H04B 1/0475* (2013.01); *B81B 3/0021* (2013.01); *H04B 1/0458* (2013.01); *B81B 2201/038* (2013.01); *B81B 2203/0127* (2013.01); *H04B 2001/045* (2013.01)

(58) Field of Classification Search
CPC .................. H04B 1/0475; H04B 2001/045
USPC ....................................... 455/127.2
See application file for complete search history.

(56) References Cited

U.S. PATENT DOCUMENTS

| 6,988,026 | B2* | 1/2006 | Breed | G07C 5/008 |
| | | | | 701/31.4 |
| 7,103,460 | B1* | 9/2006 | Breed | B60C 23/0408 |
| | | | | 701/29.1 |
| 7,580,687 | B2* | 8/2009 | Ichitsubo | H03F 3/195 |
| | | | | 330/126 |
| 7,630,693 | B2* | 12/2009 | Liu | H03H 7/38 |
| | | | | 455/127.1 |
| 7,769,355 | B2* | 8/2010 | Ichitsubo | H01L 23/66 |
| | | | | 330/126 |
| 7,902,585 | B2* | 3/2011 | Larson | H01L 27/0811 |
| | | | | 257/312 |
| 8,693,963 | B2* | 4/2014 | du Toit | H01P 5/04 |
| | | | | 333/17.3 |
| 9,166,271 | B2* | 10/2015 | Peroulis | H01P 7/065 |
| 9,246,223 | B2* | 1/2016 | Badaruzzaman | H03H 7/40 |
| 2004/0130442 | A1* | 7/2004 | Breed | B60C 11/24 |
| | | | | 340/443 |

(Continued)

OTHER PUBLICATIONS

F. Giacomozzi et al., *A Flexible Fabrication Process for RF MEMS Devices*, Romanian Journal of Information Science and Technology, vol. 14, No. 3, 2011, pp. 259-268.

*Primary Examiner* — April G Gonzales
(74) *Attorney, Agent, or Firm* — Workman Nydegger

(57) ABSTRACT

A wideband power attenuator in RF-MEMS multilayer technology, for attenuating an electromagnetic signal, includes an upper layer with two RF ground planes, and between said two RF ground planes a central RF-MEMS movable switch as a floating electrode, an RF input, an RF output of an RF line running across the attenuator, a number of lower layers including in sequence: a ground floor of an electrically insulating substrate; two DC biasing electrodes to electrostatically control said movable switch, and DC biasing lines to feed the DC biasing electrodes; two DC-RF decoupling resistors, each decoupling resistor being connected on one side to respective terminals of said movable switch, and on the other side to respective one of the two RF ground planes; a resistive load adapted to be connected to the RF line to attenuate the electromagnetic signal on the basis of the floating movable switch configuration, between a non-contact RF position and a contact RF position with said RF line.

10 Claims, 23 Drawing Sheets

(56) References Cited

U.S. PATENT DOCUMENTS

| | | | |
|---|---|---|---|
| 2005/0192727 A1* | 9/2005 | Shostak | B60C 11/24 701/37 |
| 2005/0273218 A1* | 12/2005 | Breed | B60C 11/24 701/2 |
| 2006/0025897 A1* | 2/2006 | Shostak | B60C 23/005 701/1 |
| 2007/0298736 A1* | 12/2007 | Fujioka | H03F 1/0266 455/127.3 |
| 2009/0075608 A1* | 3/2009 | Ichitsubo | H04B 1/44 455/127.2 |
| 2009/0207091 A1* | 8/2009 | Anagnostou | H01Q 9/285 343/876 |
| 2011/0210801 A1* | 9/2011 | Rottenberg | G01K 7/32 331/156 |
| 2015/0180518 A1* | 6/2015 | Whittaker | H03F 3/245 455/127.2 |

* cited by examiner

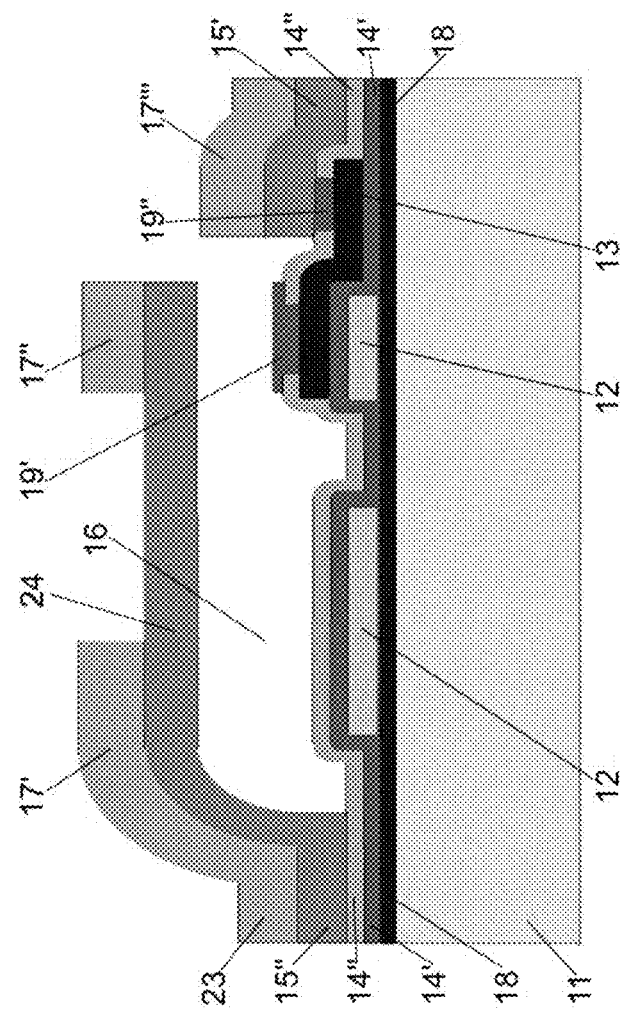
FIG. 1.1

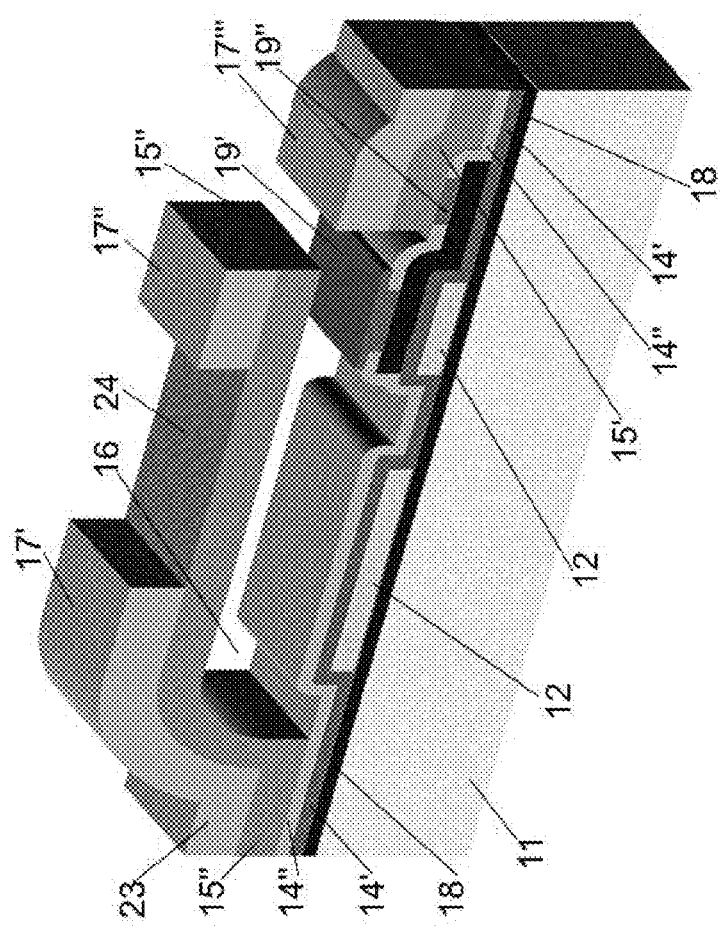
FIG. 1.2

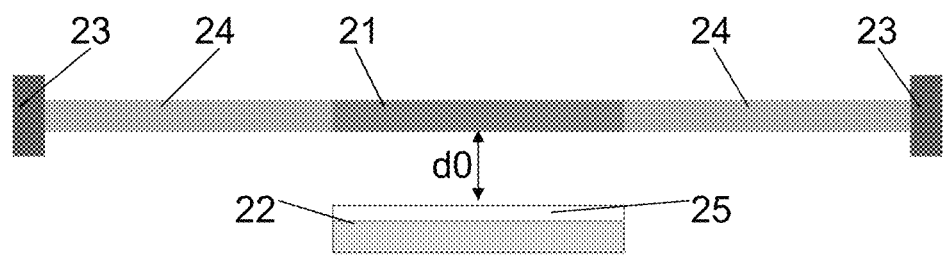
FIG. 3.1
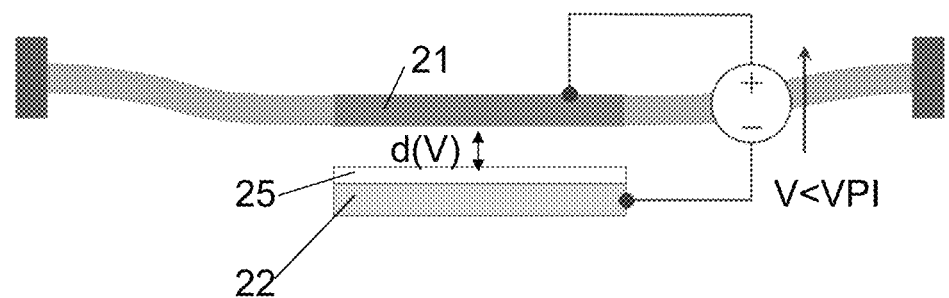
FIG. 3.2
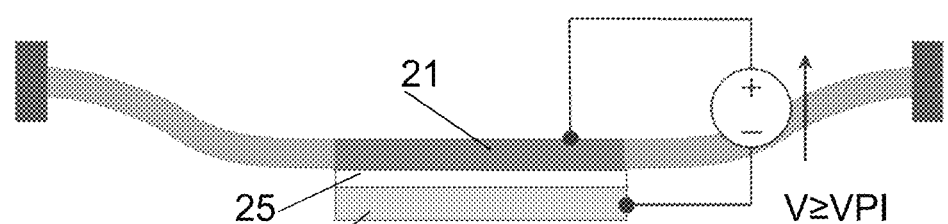
FIG. 3.3

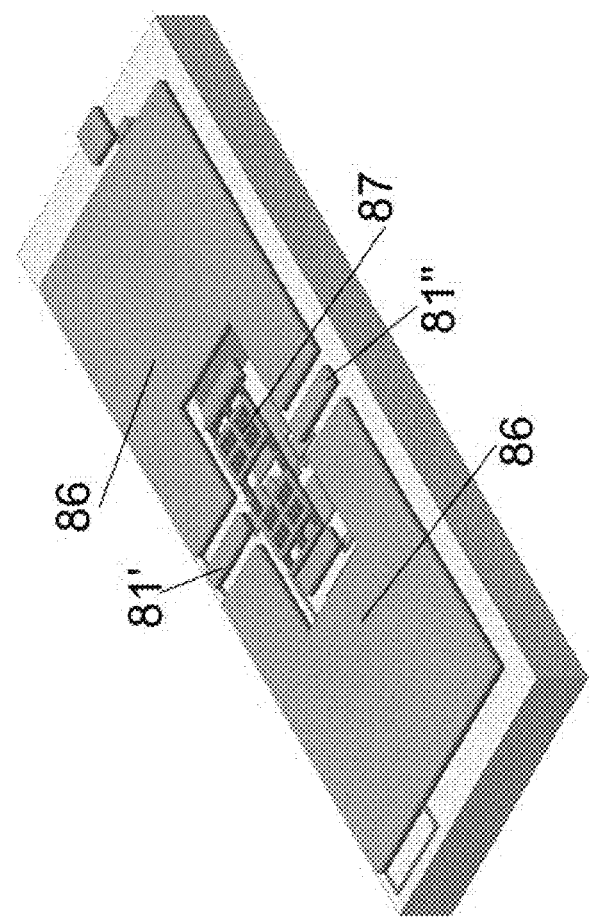
FIG. 5.2
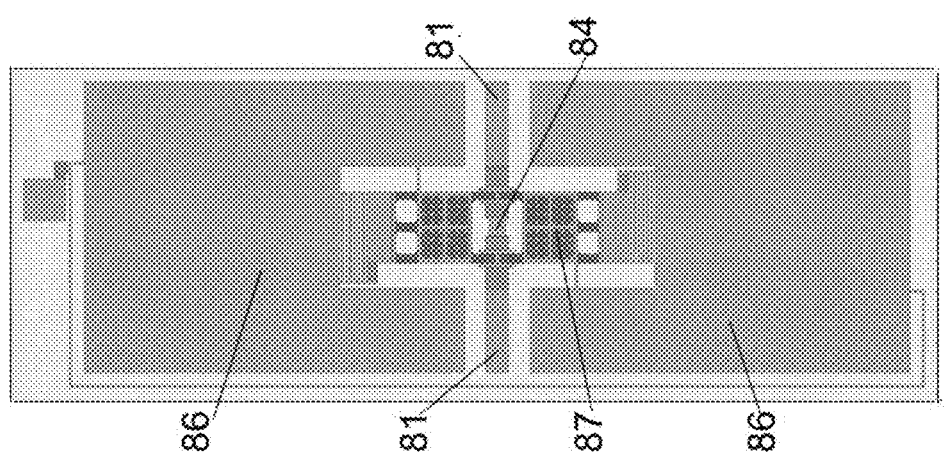
FIG. 5.1

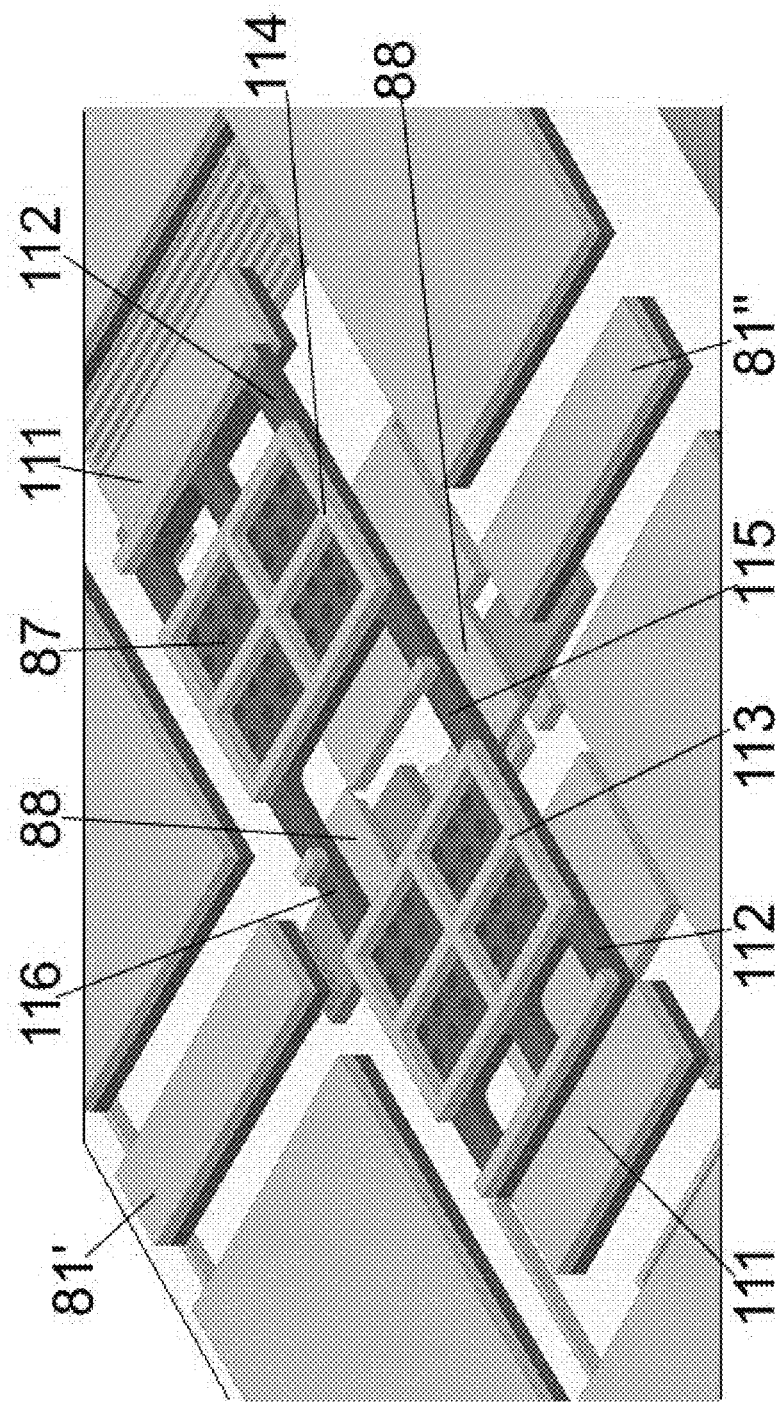
FIG. 5.3

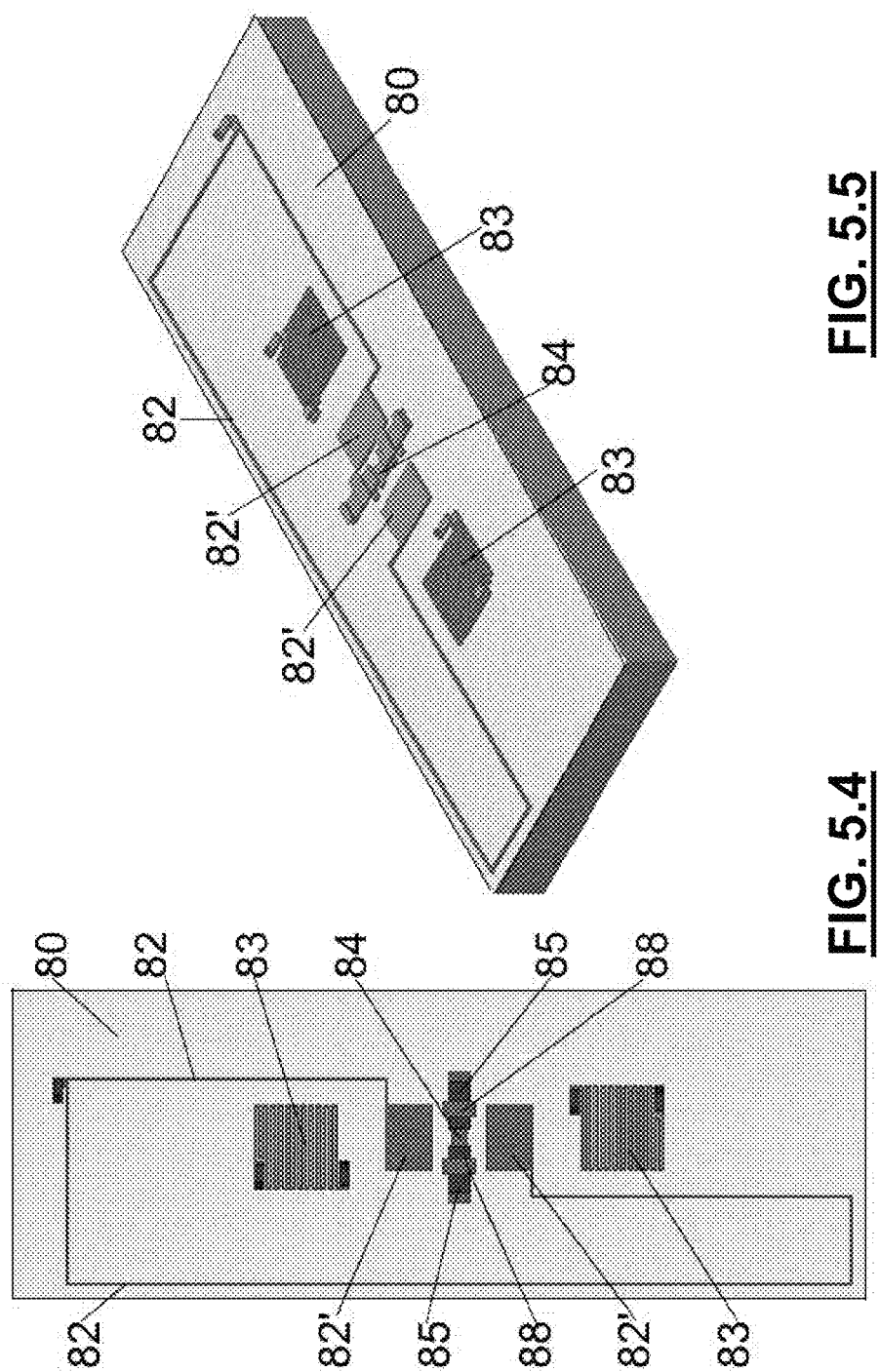
FIG. 5.5
FIG. 5.4

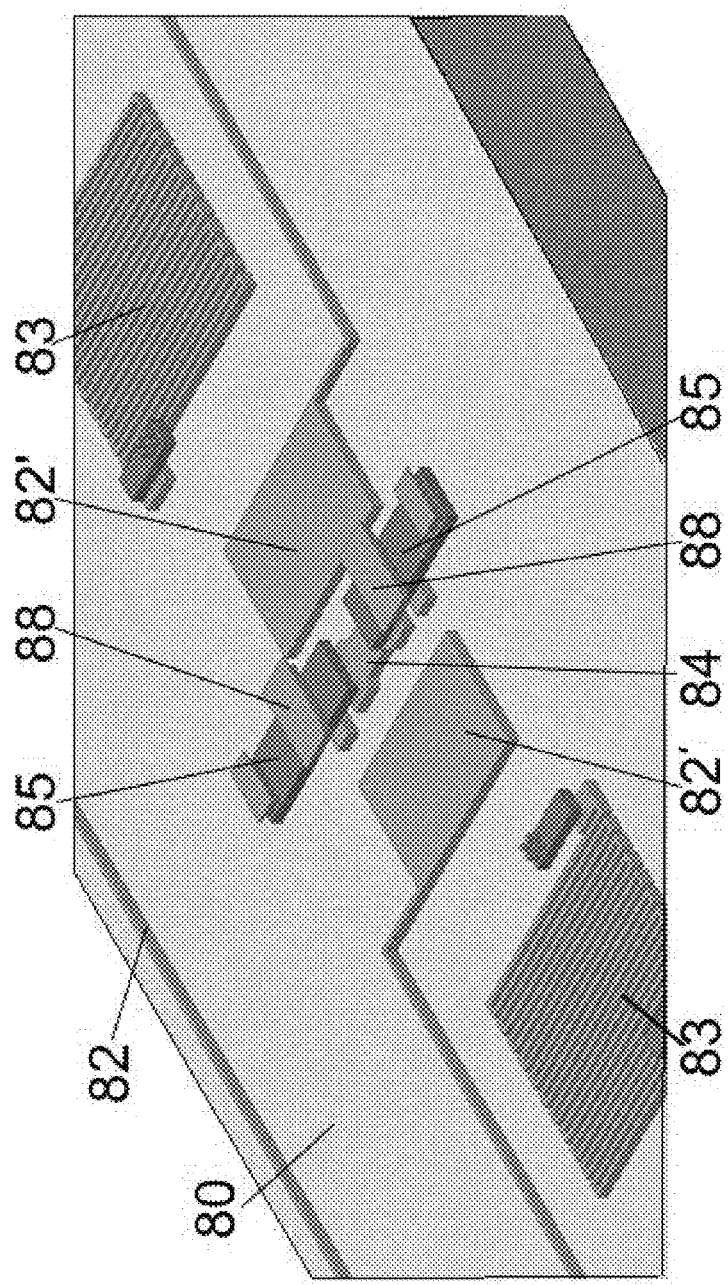
FIG. 5.6

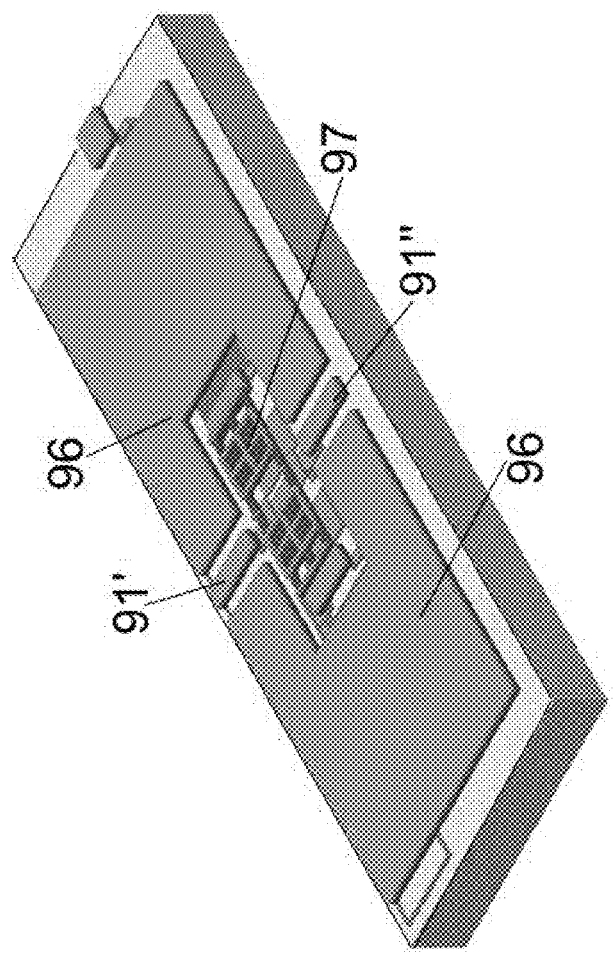
FIG. 6.2
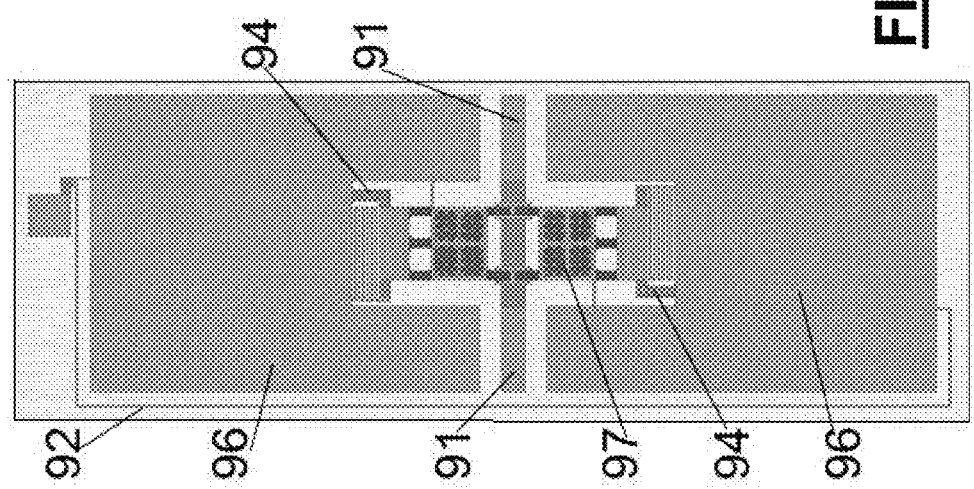
FIG. 6.1

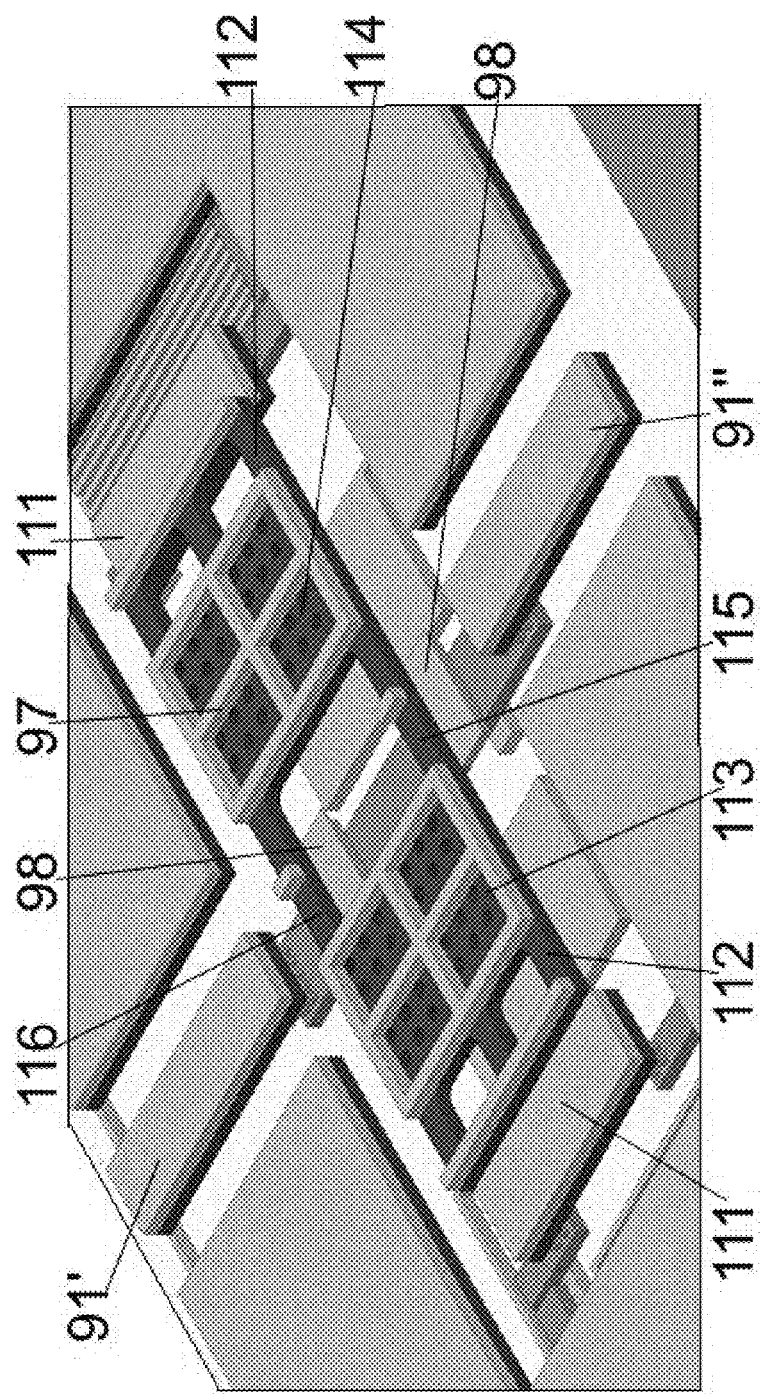
FIG. 6.3

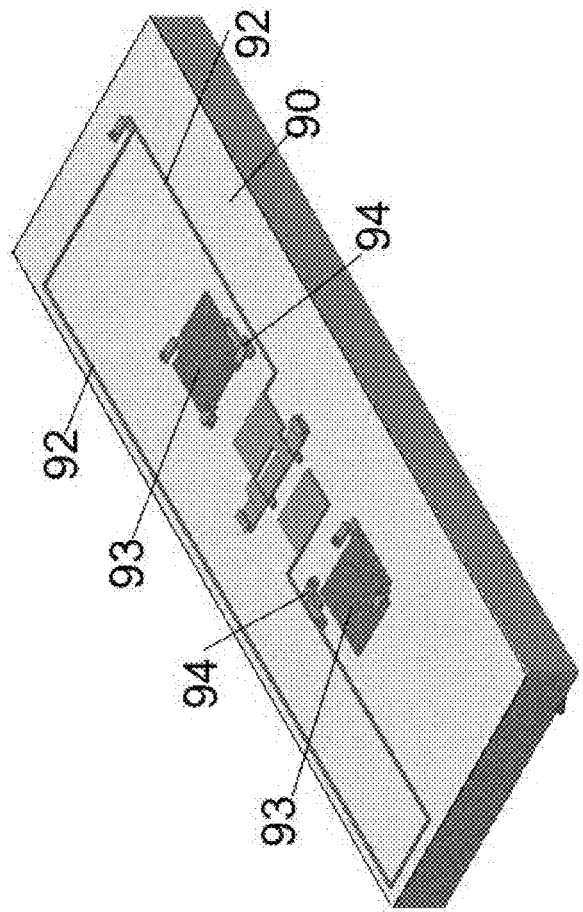
FIG. 6.5
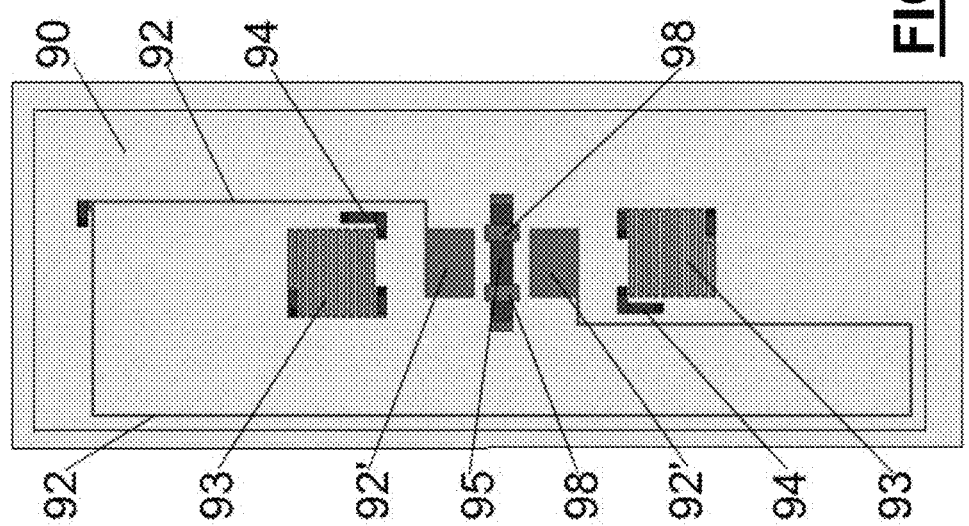
FIG. 6.4

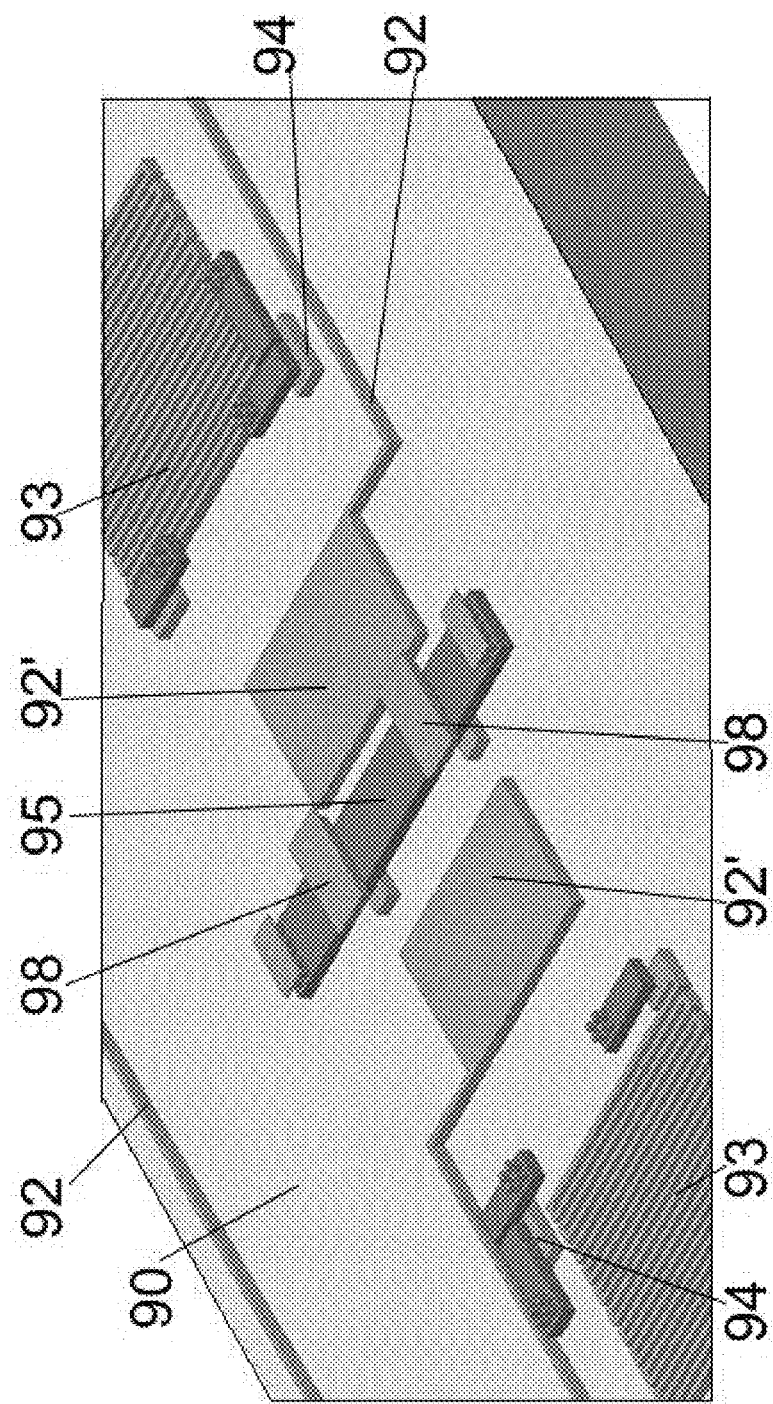
FIG. 6.6

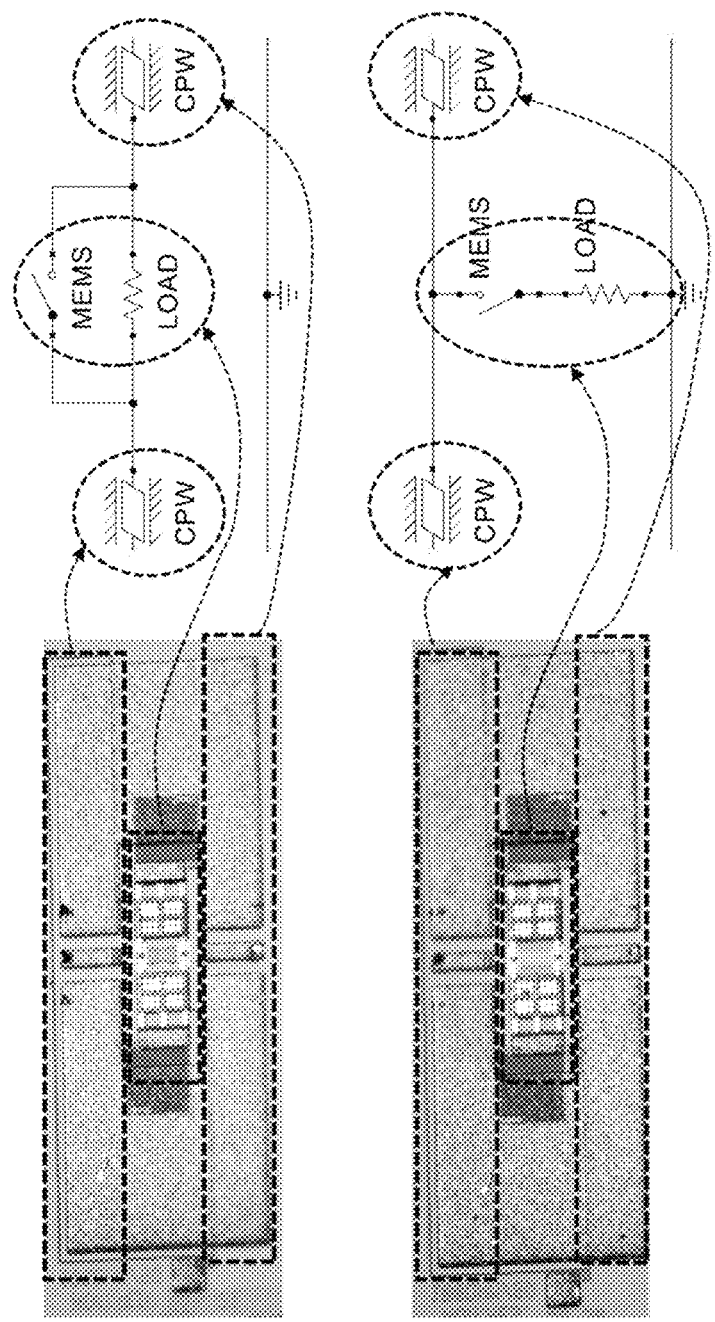

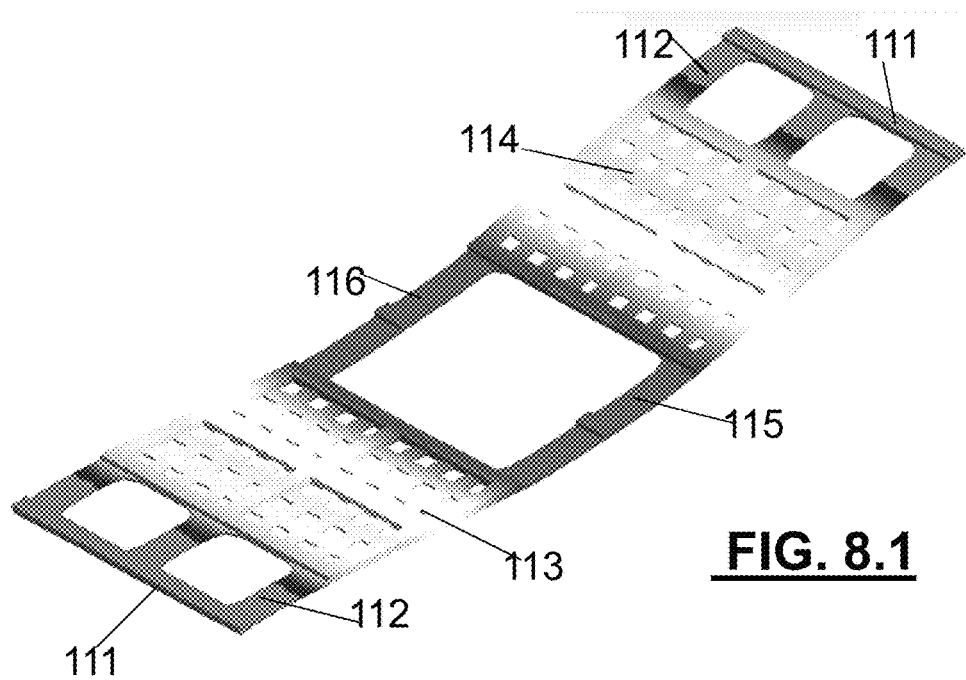
FIG. 8.1
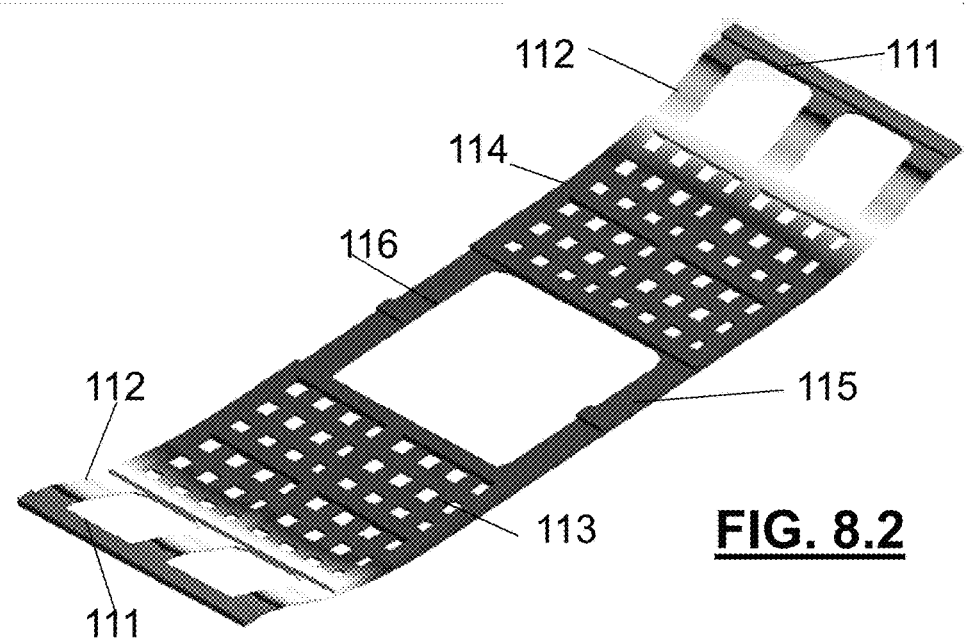
FIG. 8.2

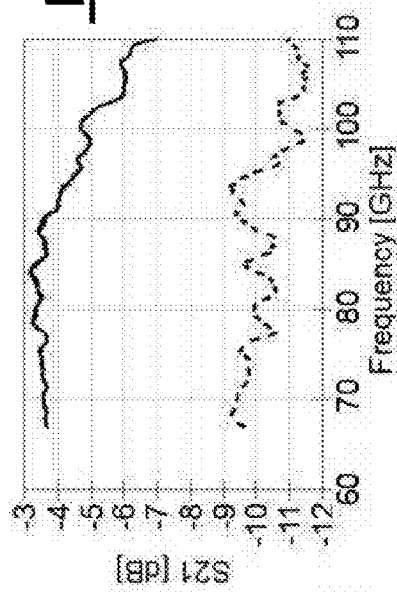
FIG. 10e
FIG. 10f
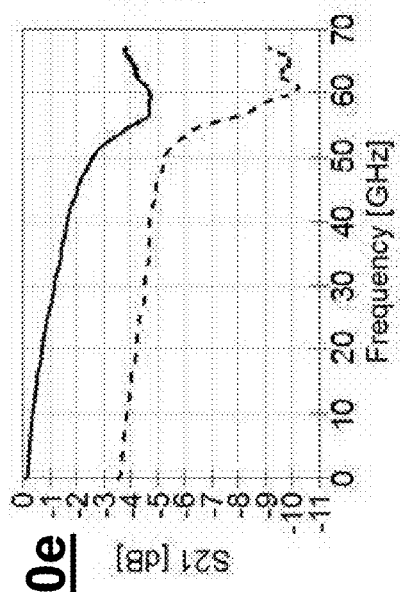
FIG. 10g
FIG. 10h

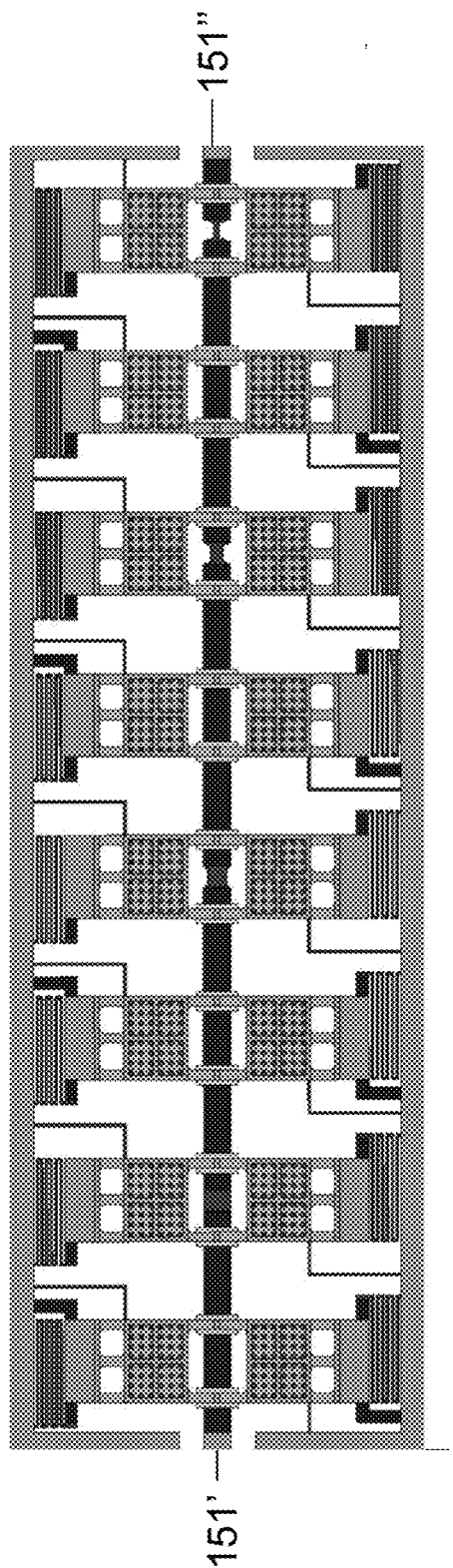
FIG. 12.1
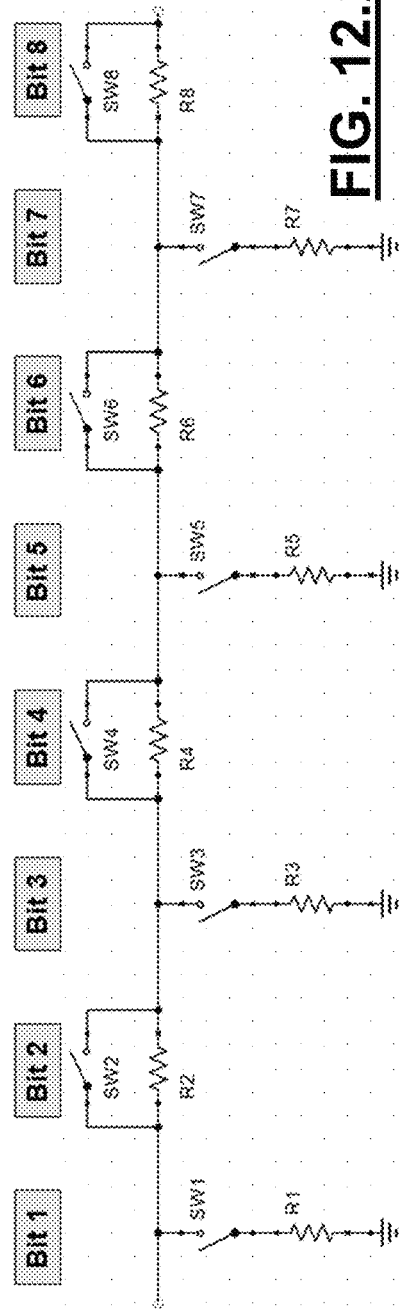
FIG. 12.2

WIDEBAND POWER ATTENUATORS IN RF-MEMS TECHNOLOGY

BACKGROUND OF THE INVENTION

1. Field of the Invention

The present invention relates to wideband power attenuators in RF-MEMS technology.

2. Description of the Prior Art

The upcoming communication standards referred to as 5G (i.e., 5th generation of mobile networks) are posing challenging demands, in terms of expected performances, on the hardware components needed to realize transceivers (i.e., transmitters/receivers). Briefly, modern transceivers employed, for instance, in smartphones and base stations for mobile services, will be required to operate at high-frequency (e.g., 60 GHz and, very likely, above) and to be able to hop across frequency bands rather distant from each other (i.e., frequency agility). This means that passive Radio Frequency (RF) components, like, e.g., filters, switching units, impedance tuners, phase shifters, power attenuators, and so on, must exhibit a very-wide frequency range of operation, as well as remarkable characteristics in terms of tunability, reconfigurability, high-isolation, low-loss, high quality factor and pronounced linearity.

The general aim is spent toward efforts related to the realization of hardware components (both active circuitry and passive elements) able to meet the challenging requirements of 5G standards. On the other hand, it must be highlighted that 5G specifications are currently being identified and evaluated. This means that the specs are not yet fixed and the best technology solutions must be identified to fulfil them. Differently, in the current situation, options and solutions at technology level can still enable certain performances and, therefore, exert some sort of impact on the final specifications of 5G. In other words, we are still partially in a bottom-up scenario (i.e., given certain technology solutions, which performances can be targeted) rather than top-down (i.e., given certain specifications, what is the best technology solution in terms of cost, reliability, integration). Given this scenario, with specific focus on passive RF components, several technologies are being developed, and it is rather clear that there will not be a unique solution able to satisfy all the 5G requirements. This opens opportunities for those technologies that, up to now, showed very good characteristics, but whose spread in the market scenario has been impaired by key-aspects, like, higher cost, non-compatibility with standard technologies (like CMOS), integration and packaging issues, and so on. Among the just mentioned emerging technologies, RF-MEMS (MicroElectroMechanical-Systems for Radio Frequency applications) is one of the more promising.

As mentioned above, there will not be a unique technology able to ensure proper compliance with all the requirements demanded to passive RF components. In general terms, the performances of standard semiconductor technologies (i.e., CMOS) can be significantly improved, e.g., using substrate materials different from Silicon, but all this implies increased manufacturing costs and complications at technology level. Moreover, key-features like very-broadband operability, do not seem to be fully addressable by the just-mentioned solutions.

On the other hand, RF-MEMS have always been addressed as a technology solution exhibiting remarkable characteristics in terms of performances, but also requiring to address additional issues at packaging, integration and reliability level, and, therefore, additional costs. Moreover, a factual need at market level for such high-performances, was not really present. These are the reasons why RF-MEMS technology never took-off in commercial applications in the past.

Nowadays, the overall scenario changed quite radically. In the first place, very-high performances of RF passive components are becoming a key-feature to enable 5G standards. Such a "market-pull" driving aspect makes now reasonable the fact of facing additional costs and increased technology complexity in order to manufacture devices with the requested characteristics. This is already happening with the standard semiconductor technologies, that are being improved by using materials other than Silicon (i.e., not-fully standard anymore).

On the other hand, RF-MEMS technology is costlier than standard CMOS solutions, but with equivalent price or cheaper than non-standard active technologies, like Silicon-Germanium (SiGe), Gallium-Arsenide (GaAs), and so on. Moreover, concerning some specific features, like wideband operability, low-loss, linearity, high-isolation, RF-MEMS passives are able to score the best results.

All in all, an idea about the potential of RF-MEMS in the 5G scenario, can be grasped simply summarizing in a few words the history of such a technology. RF-MEMS started to be demonstrated in the scientific community from 2nd half of '90s. Since then, there were great expectations around the successful exploitation of RF-MEMS passives in mobile devices and RF transmitters/receivers (transceivers). To this regard, several market forecasts were released since the early years of 2000s. In fact, RF-MEMS never had success in consumer electronics, but exclusively in niche small segments, like space and defense. This happened because the remarkable performances of RF-MEMS were not needed in early mobile generations (e.g., 2G/3G), and this circumstance would not have justified the additional costs and issues necessary for their employment (technology-push approach).

In recent years, with the widespread diffusion of smartphones, a degradation trend in the quality of voice and data transmission emerged, due to the integration of the antenna with a large number of other components. This context generates an actual need to develop RF-MEMS components particularly efficient in the emerging scenarios to address the demanding requirements of some critical applications, like 5G applications, in terms of low-loss, wideband operation/operability, high-isolation, good-linearity, and so on.

SUMMARY OF THE INVENTION

The main idea lying beneath the invention is to exploit the RF-MEMS technology to realize wideband power attenuators, described in the following in a number of variant embodiments, in particular to address the demanding requirements of 5G applications (i.e., 5th generation of mobile networks), in terms of low-loss, wideband operation/operability, high-isolation, good-linearity, and so on.

Looking at specific technical aspects of the invention from a general perspective, the founding idea is to exploit electrostatic attractive force to realize miniaturized micro-relays in MEMS technology. Such micro-relays, or switches, represent the basic element that enables reconfiguration of the signal manipulating function in the wideband power attenuators.

The RF-MEMS manufacturing process is based on a surface micromachining technology, realized on top of Silicon or Quartz 6-inch substrates. Through a suitable sequence of selective deposition/removal of conductive/insulating thin-films steps, the complete structure of miniaturized (i.e., MEMS) elements is implemented.

In one embodiment of the present invention, it is provided a wideband power attenuator in RF-MEMS multilayer technology, for attenuating an electromagnetic signal, comprising:

an upper layer with two RF ground planes, and between said two RF ground planes a central RF-MEMS movable switch as a floating electrode, an RF input, an RF output of an RF line running across the attenuator, a number of lower layers comprising in sequence:
a ground floor of an electrically insulating substrate,
two DC biasing electrodes to electrostatically control said movable switch, and DC biasing lines to feed the DC biasing electrodes;
two DC-RF decoupling resistors, each decoupling resistor being connected on one side to respective terminals of said movable switch, and on the other side to respective one of the two RF ground planes;
a resistive load adapted to be connected to the RF line to attenuate the electromagnetic signal on the basis of the floating movable switch configuration, between a non-contact RF position and a contact RF position with said RF line.

Preferably said resistive load is adapted to perform as a series attenuator, to be connected in series between said RF input and said RF output when said movable switch is in said non-contact RF position, and to be bypassed when said movable switch is in said contact RF position, said movable switch performing as RF bypass.

Preferably said resistive load is adapted to perform as a shunt attenuator, to be connected between said RF ground plane and said RF line, shunt to ground, when said movable switch is in said contact RF position, and to be disconnected when said movable switch is in said non-contact RF position.

In another embodiment of the present invention it is provided a wideband reconfigurable programmable multi-state power attenuator in the RF-MEMS multilayer technology, comprising more than one wideband power attenuator in RF-MEMS multilayer technology as above, wherein said more than one wideband power attenuator in RF-MEMS multilayer technology are cascaded above a common substrate, between an RF input and an RF output terminal, framed among two common RF ground planes, and individually actuated over a unique RF underpass central line by respective ones of said DC biasing electrodes.

According to another aspect of the invention, it is provided a telecommunication apparatus, comprising at least one antenna driven by cascaded phase shifters and attenuators, wherein at least one of said attenuators is a wideband reconfigurable programmable multi-state power attenuator in the RF-MEMS multilayer technology as above.

These and further objects are achieved by means of an apparatus and method as described in the attached claims, which are considered an integral part of the present description.

BRIEF DESCRIPTION OF THE DRAWINGS

For a better understanding of the invention, examples of embodiments of the invention are described in the following, which shall be considered only as non-limiting examples, in connection with the attached drawings wherein:

FIGS. 1.1, 1.2 show a basic structure, respectively in side view and perspective view, of the layers of an element in the RF-MEMS technology;

FIGS. 3.1-3.3 show three examples of cross-section of the element of FIG. 2;

FIGS. 5.1-5.3 show, respectively in side view, perspective view, and partly enlarged view, the layout of the device according to a first embodiment example of a basic series attenuator module, displaying the layout of all layers;

FIGS. 5.4-5.6 show, respectively in side view, perspective view, and partly enlarged view, the layout of the device according to the first embodiment example of the basic series attenuator module, displaying the layout of the lower layers;

FIGS. 6.1-6.3 show, respectively in side view, perspective view, and partly enlarged view, the layout of the device according to a second embodiment example of a basic shunt attenuator module, displaying the layout of all layers;

FIGS. 6.4-6.6 show, respectively in side view, perspective view, and partly enlarged view, the layout of the device according to the second embodiment example of the basic shunt attenuator module, displaying the layout of the lower layers;

FIG. 7.1 shows the equivalent lumped element circuit of the basic series attenuator module;

FIG. 7.2 shows the equivalent lumped element circuit of the basic shunt attenuator module;

FIGS. 8.1, 8.2 show details of the embodiment of the movable gold bridge, as an element of the basic series and shunt attenuator modules;

FIGS. 10a-10h show trends of the measured attenuation/loss or Voltage Standing Wave Ratio of the series/shunt attenuator modules vs. frequency;

FIG. 12.1, 12.2 show respectively another view of the layout of FIG. 11 and the lumped elements equivalent circuit of said reconfigurable multi-state RF power attenuator;

The same reference numerals and letters in the figures designate the same or functionally equivalent parts.

DESCRIPTION OF THE PREFERRED EMBODIMENTS

Figure 2:
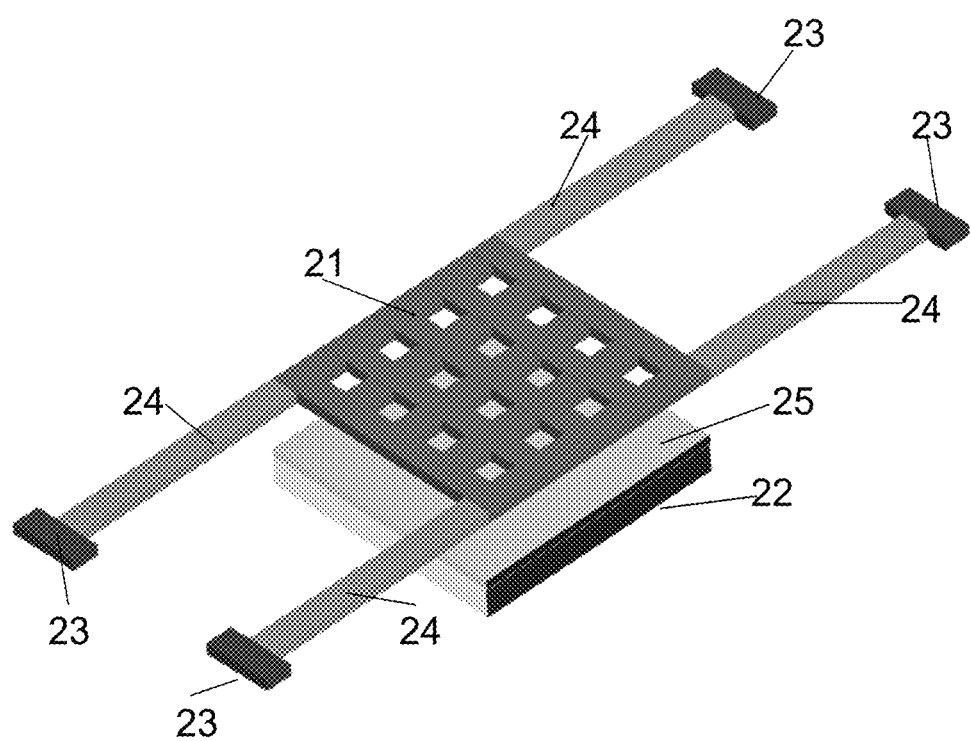
FIG. 2 shows a schematic functional example of implementation of the device of FIGS. 1.1, 1.2.

In the following exemplary non-limiting examples of embodiments of the wideband power attenuator in RF-MEMS technology of the invention are described, with reference to different kinds of features of the same.

As known, for example with reference to the article F. Giacomozzi, V. Mulloni, S. Colpo, J. Iannacci, B. Margesin, A. Faes, "A Flexible Fabrication Process for RF MEMS Devices", Romanian Journal of Information Science and Technology (ROMJIST), vol. 14, Number 3, 2011, ISSN: 1453-8245, pp. 259-268, the RF-MEMS technology relies on a surface micromachining process based on gold.

With reference to FIGS. 1.1, 1.2, in one embodiment example, high resistivity silicon wafer is employed as substrate 11 and is covered by thick field silicon oxide 18 (i.e., 1 μm thick). A cantilever based suspended structure realizes an ohmic micro-switch. High resistivity conductive polysilicon 12 and multimetal (aluminum based) layer 13 are exploited for Direct Current (DC) biasing of suspended membranes and Radio Frequency (RF) signal lines respectively. An additional mask on the polysilicon layer 12 enables the implantation of two dopant doses, leading to different sheet resistances for the same layer. Typically, a reduced dopant dose is implanted within the polysilicon of the DC bias electrodes and lines (i.e., 1500 Ω/sq) in order to reduce leakage currents and coupling with RF signals.

In one embodiment example, highly doped polysilicon (i.e., 30-300 Ω/sq) is used to obtain calibrated resistors. Both conductive layers 12, 13 (polysilicon and aluminum) are covered by respective layers of silicon oxide 14', 14", enabling the realization of Metal Insulator Metal (MIM) capacitors as well as ohmic contact where vias (i.e., openings) are defined. In one embodiment example, the surface metallization consists of a 1.8 μm electroplated gold layer 15', 15", and air-gaps 16 are obtained wherever such a metal is deposited over a 3 μm sacrificial photoresist. In order to get stiffer gold membranes, for instance in correspondence with anchors, and suspended membranes that are meant not to deform, a second gold metallization 17', 17", 17''' (i.e., about 3 μm thick) is electroplated over the first one mentioned above. Wherever vias to the multimetal are opened, a thin metal layer 19', 19" (i.e., 150 nm of gold) is evaporated in order to get a gold to gold contact when the suspended membranes are actuated.

The RF-MEMS technology enables the realization of, by way of examples, micro-relays, both capacitive and ohmic, as well as variable capacitors (i.e., varactors) that can be tuned in an analogue fashion, depending on the applied DC control signal.

With reference to FIG. 2, showing a schematic functional example of implementation of the device of FIGS. 1.1, 1.2, in all the afore-mentioned situations, the MEMS reconfigurable structure comprises a gold membrane, realizing a floating electrode 21, kept suspended, by means of anchors 23 (equivalent to layer 17', 17", 17''' in FIGS. 1.1, 1.2) and flexible suspensions 24 (equivalent to layer 15', 15" in FIGS. 1.1, 1.2 in the areas not covered by layer 17', 17", 17'''), i.e., made of electroplated gold, above an underlying fixed electrode 22, by means of flexible and deformable gold narrow beams. The underlying fixed electrode is often covered by a dielectric layer 25, in order to avoid short-circuit between the movable suspended electrode and the fixed one, when actuation (pull-in) is reached (FIG. 3.3). The DC voltage drop applied across such a couple of electrodes, determines, through electrostatic attraction, the displacement of the movable plate towards the fixed one, until their physical contact is reached. Depending on the configuration of the input/output RF signals lines underneath the suspended plate, the switch can be capacitive or ohmic, series or shunt, and so on. The schematic in FIG. 2 shows a typical geometry for an RF-MEMS electrostatically controlled tunable component (ohmic/capacitive switch, or tunable capacitor).

The flexible suspensions 24 can be implemented by serpentine-shaped slender beams, in order to adapt (i.e., lower) the equivalent spring constant of the suspensions.

With reference to the cross-section of the schematic reported in FIGS. 3.1-3-3, the working principle of an electrostatically controlled RF-MEMS component is more detailed. When no bias is applied between the movable membrane and the underlying electrode, the RF-MEMS structure is in the rest position, as FIG. 3.1 shows. In this case, the distance d0 between the two electrodes is the maximum possible, and the capacitance, in turn, assumes the minimum value, in case the device is meant to be a varactor. On the other hand, when a bias (i.e., a DC voltage) is applied between the two electrodes, the electrostatic attraction force causes the suspended plate to move toward the underlying electrode, as it is anchored to flexible suspensions.

The smaller the distance between the suspended and the fixed electrode, the larger is the capacitance realized by the RF-MEMS variable capacitor. By increasing the applied voltage, one can further increase the capacitance. However, the whole distance d0 cannot be used to tune seamlessly the capacitance. Indeed, when the downward displacement of the suspended plate 21 reaches d0/3 (i.e., one-third of the initial air-gap), the balance between the attractive electrostatic force and the restoring mechanical force, induced by the deformed suspensions, reaches a condition of instability, and the plate collapses onto the underlying surface. This phenomenon is known as pull-in, and the bias level causing such an abrupt snap down of the movable membrane is referred to as pull-in voltage (VPI). FIG. 3.2 shows the movable plate configuration when the applied bias is smaller than the pull-in voltage (V<VPI), while FIG. 3.3 reports what happens when the applied bias is larger than the pull-in voltage (V≥VPI). In the latter case, the insulating layer deposited above the fixed electrode prevents an electrical short between the two conductive layers, and the capacitance jumps to the maximum value. All the possible combinations of switch configurations and features are summarized in Table I. All the characteristics and configurations listed there can be combined in different fashions, resulting in several implementations of RF-MEMS switches

| Series | Shunt | On | Off | Switch state | Ohmic | Capacitive |
|---|---|---|---|---|---|---|
| X | | | X | Closed | Low resistance | Low impedance |
| X | | | X | Open | High resistance | High impedance |
| | X | X | | Open | High resistance | High impedance |
| | X | | X | Closed | Low resistance | Low impedance |

Figure 4:
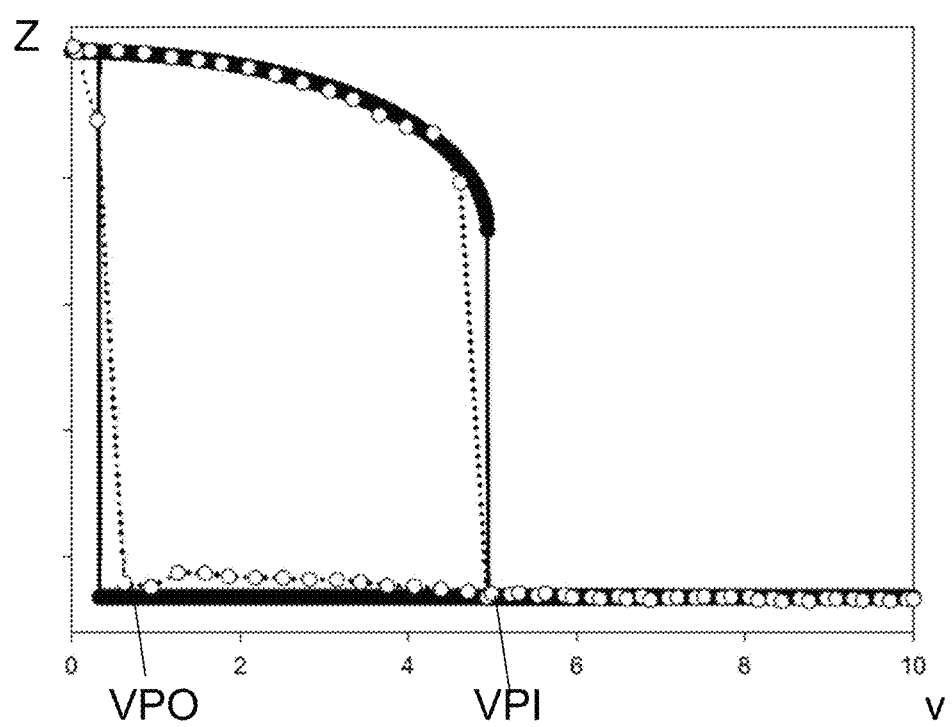
FIG. 4 shows a diagram of the vertical displacement Z vs. applied voltage of the typical pull-in/pull-out characteristic of the device of FIG. 2.

As mentioned before, the RF-MEMS devices are electrostatically actuated. The vertical displacement Z of the central rigid electrode is controlled by an applied DC voltage, which presents a critical value, namely the pull-in voltage VPI, causing the collapse of the movable membrane onto the underlying electrode. Such a behavior presents hysteresis, the actuation voltage VPI being larger than the release voltage VPO (pull-out). The typical pull-in/pull-out characteristic, when the DC bias is swept up and down along the voltage axis, is shown in FIG. 4. Experimental data are shown in the form of sequence of dots, instead simulation data in the form of continuous lines.

Moving now the attention on the RF characteristics of RF-MEMS, the ON/OFF behavior, controlled by DC bias, enables significant reconfiguration of the function realized by the device itself. As already stated before, the arrangement of the electrodes and RF lines terminations underneath the suspended membrane, determines the characteristic of the manipulation function realized by the relay.

Typically, when the micro-relay is OPEN, i.e., the RF-MEMS switch is OFF (not actuated), the device exhibits an isolation, between the input and output terminations, better than 20 dB up to 13 GHz. Differently, when the micro-relay is CLOSED, i.e., the MEMS switch is ON (actuated/pulled-in), the loss is below 1 dB from 2 GHz up to 13 GHz, while the reflection is better than 15 dB starting from 2 GHz.

According to an aspect of the invention, basic wideband power attenuator modules are realized in the RF-MEMS surface micromachining process, described in general terms in the above cited article. The polysilicon is doped with Boron and different doses are implanted in the same layer (2 lithographic steps). The first low concentration dose yields the typical High Resistivity (HR) of poly-Si (around 1.5 kΩ/sq), suitable for the buried DC biasing lines and electrodes. This ensures limited coupling and cross talk between DC and RF signals. A second Boron implant (high concentration dose) is performed selectively only where poly-Si is exploited to realize the attenuator resistive loads (around 140 Ω/sq), and is named Low Resistivity (LR) poly-Si. Differently, the second buried (i.e., covered by an oxide layer) layer based on aluminum is highly conductive and is used for RF signals underpass. The microphotographs of fabricated samples and the layout designs are shown in FIG. 5 (in details in the following FIGS. 5.1-5.6) for the series attenuator module, and in FIG. 6 (in details in the following FIGS. 6.1-6.6) for the shunt attenuator module.

The fabrication of the RF-MEMS attenuators is performed starting from a silicon substrate (11 in FIG. 1.1) with an insulating oxide layer deposited over it (18 in FIG. 1.1). This can be considered the "ground floor", as all the other layers constituting the RF-MEMS devices, are patterned/deposited on vertically incremental stacked levels (see FIG. 1.1). Starting from the just mentioned ground floor, there are five elevated levels of interest for the RF-MEMS attenuators that, from bottom to top, are listed as follows:
1) Poly-Si, both LR and HR (12 in FIG. 1.1);
2) Aluminum layer (13 in FIG. 1.1);
3) Evaporated gold thin layer (19', 19" in FIG. 1.1);
4) Electroplated gold (15', 15", 23, 17''' in FIG. 1.1);
5) Deformable gold membrane (24, 17', 17" in FIG. 1.1) defining air-gaps (16 in FIG. 1.1).

The first two levels (Poly-Si and aluminum layer) are defined as buried layers, because they are covered by oxide layers (14', 14" in FIG. 1.1). All the other layers are gold metallizations, evaporated and electroplated above the mentioned buried layers.

More particularly, with reference to the RF-MEMS basic wideband series power attenuator module, a non-limiting example of embodiment is shown in FIG. 5.

FIGS. 5.1, 5.2, 5.3 show the layout of the device, in a close-up around the RF-MEMS switch, displaying all layers, comprising lower buried layers and upper gold metallizations layer, respectively in front view, perspective view and enlarged view of a portion of the perspective view.

The upper layer comprises gold metallizations of two RF ground planes (Coplanar Waveguide—CPW) 86, of a central RF-MEMS movable switch 87 (floating electrode) and of an RF input 81' and an RF output 81" of the RF line 81 running across the device, and bearing the series load LR Poly-Si resistor 84 (discussed in details below).

FIGS. 5.4, 5.5, 5.6 show the layout of the lower (buried) layers, respectively in front view, perspective view and enlarged view of a portion of the perspective view.

Starting from the ground floor of the electrically insulating substrate 80, the first buried layer, i.e., Poly-Si both LR and HR, is exploited to realize the following three functional elements of the RF-MEMS series attenuator:
1) Two DC biasing electrodes (HR Poly-Si) 82' to electrostatically control the movable MEMS switch 87, and DC biasing lines 82 (HR Poly-Si) to feed the DC biasing electrodes 82';
2) Two DC-RF decoupling resistors (HR Poly-Si) 83. Each decoupling resistor 83 is connected on one side to the MEMS switch 87, and on the other end to one of the two RF ground planes 86;
3) The series resistive load (LR Poly-Si) 84 that attenuates the RF signal, when the MEMS switch is not actuated (i.e., in the rest position), as shown in FIG. 3.1.

With reference to the latter case of the LR Poly-Si series resistance 84, the transitions between the five different vertical levels mentioned before, both concerning buried layers and gold metallizations, are now going to be explained in details. To do so, having in mind FIG. 5.1, all the vertical transitions between stacked layers along the RF line 81 are going to be described, moving from left to right of figure (i.e., from the RF input 81' to the RF output 81" of the RF-MEMS series attenuator). Also the other figures from FIG. 5.2 to FIG. 5.6 will be referenced moving from left to right of the device.

The RF input line 81' is realized in electroplated gold double layer (15", 23 in FIG. 1.1). Moving to the right, at the end of 81', an evaporated gold area (like 19" in FIG. 1.1) establishes electrical contact to the bottom aluminum line underpass 85 through a down vertical transition (through an oxide layer like 14" in FIG. 1.1). Then, the first electrical contact area 88 in evaporated gold (as 19' in FIG. 1.1) is defined above the underpass 85. The contact area 88 is placed right underneath the gold slender beam 116 of the suspended MEMS switch 87.

Moving further to the right, at the end of the aluminum underpass 85, a down vertical transition (through an oxide layer like 14' in FIG. 1.1) is established to the lower buried layer 84, i.e., the LR Poly-Si realizing the series resistive load. At the end of 84, an up vertical transition (through an oxide layer like 14' in FIG. 1.1) establishes contact to the second aluminum underpass 85 (i.e., on the RF output branch).

Moving further to the right, the second electrical contact area 88 in evaporated gold (as 19' in FIG. 1.1) is defined above the underpass 85. The contact area 88 is placed right underneath the gold slender beam 115 of the suspended MEMS switch 87. The physical gold-to-gold contact between the contact areas (placed both on the RF input and output branches) 88 and the slender beam 116 and 115, takes place only when the MEMS switch is actuated (pulled-in as in FIG. 3.3). Instead, when the MEMS switch is in the rest position (as in FIG. 1.1) there is no contact between 88 and 115, 116. It must also be noted that the MEMS switch (or floating membrane) is kept suspended in air by means of the anchoring areas 111 (like 15" and 23 in FIG. 1.1). When a DC biasing signal is applied, the MEMS switch 87 moves downward thanks to the deformation of the beams 112 (corresponding to 24 in FIG. 1.1).

Moving again to the right, at the end of the aluminum underpass 85 an up vertical transition (through an oxide layer like 14" in FIG. 1.1) brings electrical contact to an evaporated gold area that is covered by the RF output line 81" realized in electroplated gold double layer (15", 23 in FIG. 1.1).

When the MEMS switch 87 is actuated (as in FIG. 3.3), physical contact is established between the contact areas 88 and the above fingers 115 and 116. Therefore, the RF signal, when flowing from the input 81' to the output 81", encounters a very low-impedance path through the gold of the MEMS collapsed membrane (111, 112, 113, 114, 115, 116). As a result, the Poly-Si resistor 84 is shorted, and the RF signal is not attenuated.

To complete the description of all the vertical layers of the RF-MEMS series attenuator, a further consideration must be added. Regardless of the specific section of the device, any time there is an up or down vertical transition between stacked layers not laying on adjacent levels, e.g., between the electroplated gold of the RF line 81 or of the RF ground planes 86, and the buried LR Poly-Si of the resistive load 84 or the HR Poly-Si of the DC-RF decoupling resistors 83, such transitions are eventually supplemented by intermediate level/levels (in this case the aluminum layers).

In other words, it is better not to establish direct contact between the electroplated gold and the Poly-Si. Differently, a first down transition is defined between the electroplated gold and the aluminum layer (through an oxide layer like 14" in FIG. 1.1), and a second down transition is then established between the aluminum layer and the underlying Poly-Si (through an oxide layer like 14' in FIG. 1.1). This is also true when the contact has to pass from the Poly-Si to the electroplated gold, i.e., also in this case two up transitions Poly-Si/aluminum and aluminum/electroplated gold are preferably inserted.

This means that, in all the up/down transitions between the anchoring areas 111 of the MEMS switch 87 and the buried DC-RF decoupling resistors 83, and the decoupling resistors and the RF ground planes 86, intermediate up/down transitions to aluminum layer can be present. They are visible in figures from FIG. 5.1 to FIG. 5.6, despite not indicated by labels, for the sake of simplicity of reading.

More particularly, with reference to the RF-MEMS basic wideband power shunt attenuator module, a non-limiting example of embodiment is shown on of FIG. 6.

FIGS. 6.1, 6.2, 6.3 show the layout of the device, in a close-up around the MEMS switch displaying all layers, comprising lower buried layers and upper gold metallizations layer, respectively in front view, perspective view and enlarged view of a portion of the perspective view.

The upper layer comprises gold metallizations of the RF ground planes (CPW) 96, of the central MEMS movable switch 97 (floating electrode) and of the RF input 91' and RF output 91" of the RF line 91 running across the device.

FIGS. 6.4, 6.5, 6.6 show the layout of the lower (buried) layers, respectively in front view, perspective view and enlarged view of a portion of the perspective view.

Starting from the ground floor of the electrically insulating substrate 90, the first buried layer, i.e., Poly-Si both LR and HR, is exploited to realize the following 3 functional elements of the RF-MEMS shunt attenuator:

1) DC biasing electrodes (HR Poly-Si) 92' to electrostatically control the movable MEMS switch 97, and DC biasing lines 92 (HR Poly-Si) to feed the DC biasing electrodes 92';
2) DC-RF decoupling resistors (HR Poly-Si) 93. Each decoupling resistor 93 is connected on one side to the MEMS switch 97, and on the other end to one of the two RF ground planes 96;
3) The shunt resistive loads (LR Poly-Si) 94 that attenuate the RF signal, when the MEMS switch is actuated (i.e., pulled-in position), as shown in FIG. 3.3.

The transitions between the five different vertical levels mentioned before, both concerning buried layers and gold metallizations, are now going to be explained in details.

For what concerns the RF line 91, all the vertical transitions between stacked layers, moving from left to right of figure (i.e., from the RF input 91' to the RF output 91" of the RF-MEMS shunt attenuator), will be described in the following. Also the other figures from FIG. 6.2 to FIG. 6.6 will be referenced moving from left to right of the device.

The RF input line 91' is realized in electroplated gold double layer (15", 23 in FIG. 1.1). Moving to the right, at the end of 91', an evaporated gold area (like 19" in FIG. 1.1) establishes electrical contact to the bottom aluminum line underpass 95 through a down vertical transition (through an oxide layer like 14" in FIG. 1.1). Then, the first electrical contact area 98 in evaporated gold (as 19' in FIG. 1.1) is defined above the underpass 95. The contact area 98 is placed right underneath the gold slender beam 116 of the suspended MEMS switch 97.

Moving further to the right, the second electrical contact area 98 in evaporated gold (as 19' in FIG. 1.1) is defined above the underpass 95. The contact area 98 is placed right underneath the gold slender beam 115 of the suspended MEMS switch 97.

The physical gold-to-gold contact between the contact areas (placed on the RF underpass 95 connecting the input 91' and output 91" branches) 98 and the slender beam 116 and 115, takes place only when the MEMS switch is actuated (pulled-in as in FIG. 3.3). Instead, when the MEMS switch is in the rest position (as in FIG. 1.1) there is no contact between 98 and 115, 116. It must also be noted that the MEMS switch (or floating membrane) is kept suspended in air by means of the anchoring areas 111 (like 15" and 23 in FIG. 1.1). When a DC biasing signal is applied, the MEMS switch 97 moves downward thanks to the deformation of the beams 112 (corresponding to 24 in FIG. 1.1).

Moving again to the right, at the end of the aluminum underpass 95 an up vertical transition (through an oxide layer like 14" in FIG. 1.1) brings electrical contact to an evaporated gold area that is covered by the RF output line 91" realized in electroplated gold double layer (like 15", 23 in FIG. 1.1).

When the MEMS switch 97 is actuated (as in FIG. 3.3), physical contact is established between the contact areas 98 and the above fingers 115 and 116. Therefore, the RF signal, when flowing from the input 91' to the output 91", encounters a very low-impedance path through the gold of the MEMS collapsed membrane (111, 112, 113, 114, 115, 116), that brings the RF signal to the LR Poly-Si resistors 94. Such resistors are connected to the RF ground planes 96. Therefore, part of RF signal is dissipated towards RF ground, and the fraction of RF signal travelling to the output termination 91" is attenuated with respect to the incoming signal at the input termination 91'.

In order to complete the description, the path the RF signal follows from the RF signal underpass 95 to the RF ground planes 96 through the shunt load resistors 94, when the MEMS switch 97 is actuated (pulled-in like in FIG. 3.3), is now briefly commented.

Starting from the physical contact between the lower areas 98 and the MEMS collapsed fingers 115, 116, the RF signal flows through the MEMS membrane 113, 114, 112, to the anchoring areas 111. Underneath the anchoring areas 111, down vertical transitions (through an oxide layer like 14″ in FIG. 1.1) bring the RF signal to the aluminum intermediate layer. Further down vertical transitions (through an oxide layer like 14′ in FIG. 1.1) bring the RF signal to the LR Poly-Si resistive loads 94, that determine the fraction of RF signal dissipated towards RF ground. Subsequently, up vertical transitions (through an oxide layer like 14′ in FIG. 1.1) bring the RF signal to the aluminum intermediate layer. Then, further up vertical transitions (through an oxide layer like 14″ in FIG. 1.1) bring the RF signal to the gold metallizations of the RF ground planes 96, where the fraction of RF signal that manages to cross the LR Poly-Si resistors 94, is finally dissipated.

Eventually, as already explained above, transitions take place between adjacent vertical levels. This means that there is preferably no direct contact between the top gold metallizations and the buried Poly-Si, but intermediate transitions to the aluminum layer level are present.

DC-RF decoupling resistors 83, 93 are serpentine-shaped lines, made of HR Poly-Si, that exhibit a resistance in the order of 1-2 MΩ. Such large resistors are meant to ensure electrical connectivity of the DC ground to the movable MEMS switch, in order to guarantee its effective electrostatic operation (actuation/release), while maintaining, at the same time, good isolation between the RF signal and the DC signal regime. In other words, the RF signal, encountering the very-high impedance of the DC-RF decoupling resistors, does not leak to ground, but flows between the input and output ports of the device, with very low-losses.

The series module features a poly-Si resistor 84 (i.e., around 170Ω) deployed on the RF line 81 (FIG. 5.1): in practice the value of the resistor 84 can be determined on a case-by-case basis according to the specific design need. The shunt module has a dual behavior. When the RF-MEMS switch is OFF, the RF signal flows through the underpass 95 (FIG. 6.4). Differently, when the micro-relay is ON, the RF signal is attenuated by two poly-Si (42Ω each) shunt-to-ground resistors 94 (FIG. 6.4): in practice the value of the resistors 94 can be determined on a case-by-case basis according to the specific design need. In an embodiment example, both modules have an area of 1.4 mm2 and feature serpentine poly-Si resistors 83, 93 to decouple DC and RF signals.

The RF behavior of the RF-MEMS based attenuator modules described above with reference to FIGS. 5 and 6, can be described with reference to the equivalent lumped element circuit of the series module (FIG. 7.1) and shunt module (FIG. 7.2). The input/output terminations behave as ideal portions of Coplanar Waveguides (CPWs), (81, 91) while the intrinsic RF-MEMS switching unit reconfigures the resistive load "LOAD" (84, 94), depending on the particular design. In the series configuration the MEMS switch is placed in parallel with the "LOAD", in the shunt configuration the MEMS switch is placed in series with the "LOAD". Based upon such an ideal schematization, the goals in terms of performance are to achieve flat attenuation levels (i.e., within 3-4 dB of variation) over a very wide frequency range when the resistors are loading the RF line, and very limited losses (i.e., better than 4-5 dB up to 110 GHz) when the attenuating load is shorted (series design) or not inserted (shunt design).

The RF-MEMS series attenuator basic module shown in the schematics from FIG. 5.1 to FIG. 5.6, corresponds to the physical sample reported in FIG. 7.1-left, and behaves electrically as the simplified lumped element network reported in FIG. 7.1-right.

The RF-MEMS shunt attenuator basic module shown in the schematics from FIG. 6.1 to FIG. 6.6, corresponds to the physical sample reported in FIG. 7.2-left, and behaves electrically as the simplified lumped element network reported in FIG. 7.2-right.

The two different basic modules (series/shunt), present some similarities, while differentiate from each other in a few aspects, that determine their specific behavior.

Starting from similarities, both modules have the same CPW surrounding structure. This means that the input/output gold lines 81′, 81″ and the RF ground planes 86 in FIG. 5.1, 5.2, 5.3, are the same as lines 91′, 91″ and the RF ground planes 96 in FIG. 6.1, 6.2, 6.3, and are the same as the portions indicated as "CPW" in FIGS. 7.1 and 7.2.

Moreover, the MEMS switch (or floating electrode) 87 in FIG. 5.1, 5.2, 5.3 is the same as 97 in FIG. 6.1, 6.2, 6.3, and corresponds to the device indicated as "MEMS" in FIGS. 7.1 and 7.2.

What differentiates the electrical/electromagnetic/RF behavior of the two different modules, is how the loading resistor/s is/are placed with respect to the RF line. In other words, what changes in the two devices is how the buried layers (LR Poly-Si and aluminum) are deployed underneath the MEMS switch and the surrounding CPW.

Concerning the MEMS series attenuation module, the LR Poly-Si resistive load 84, discussed in details in FIG. 5.4, 5.5, 5.6, corresponds to the "LOAD" in the equivalent lumped element scheme in FIG. 7.1-right. The resistive load 84 (i.e., "LOAD" in FIG. 7.1-right) is connected in series between the input and output terminations (81′, 81″) of the device. When the MEMS membrane 87 is actuated (pulled-in as in FIG. 3.3), the "MEMS" switch in the schematic of FIG. 7.1-right is closed. Therefore, the "LOAD" is shorted, and the device does not attenuate anymore the RF signal.

Concerning the MEMS shunt attenuation module, the LR Poly-Si resistive loads 94, discussed in details in FIG. 6.4, 6.5, 6.6, correspond to the "LOAD" in the equivalent lumped element scheme in FIG. 7.2-right. Since the resistive loads 94 are two and are connected in parallel to the RF ground planes 96 (i.e., shunt configuration), the "LOAD" in FIG. 7.2-right is equivalent to their parallel. In other words, the resistance of "LOAD" is half the resistance of a single load 94. When the MEMS membrane 97 is actuated (pulled-in as in FIG. 3.3), the "MEMS" switch in the schematic of FIG. 7.2-right is closed. Therefore, the "LOAD" is inserted on the RF line, and the device attenuates the RF signal.

Figure 9:
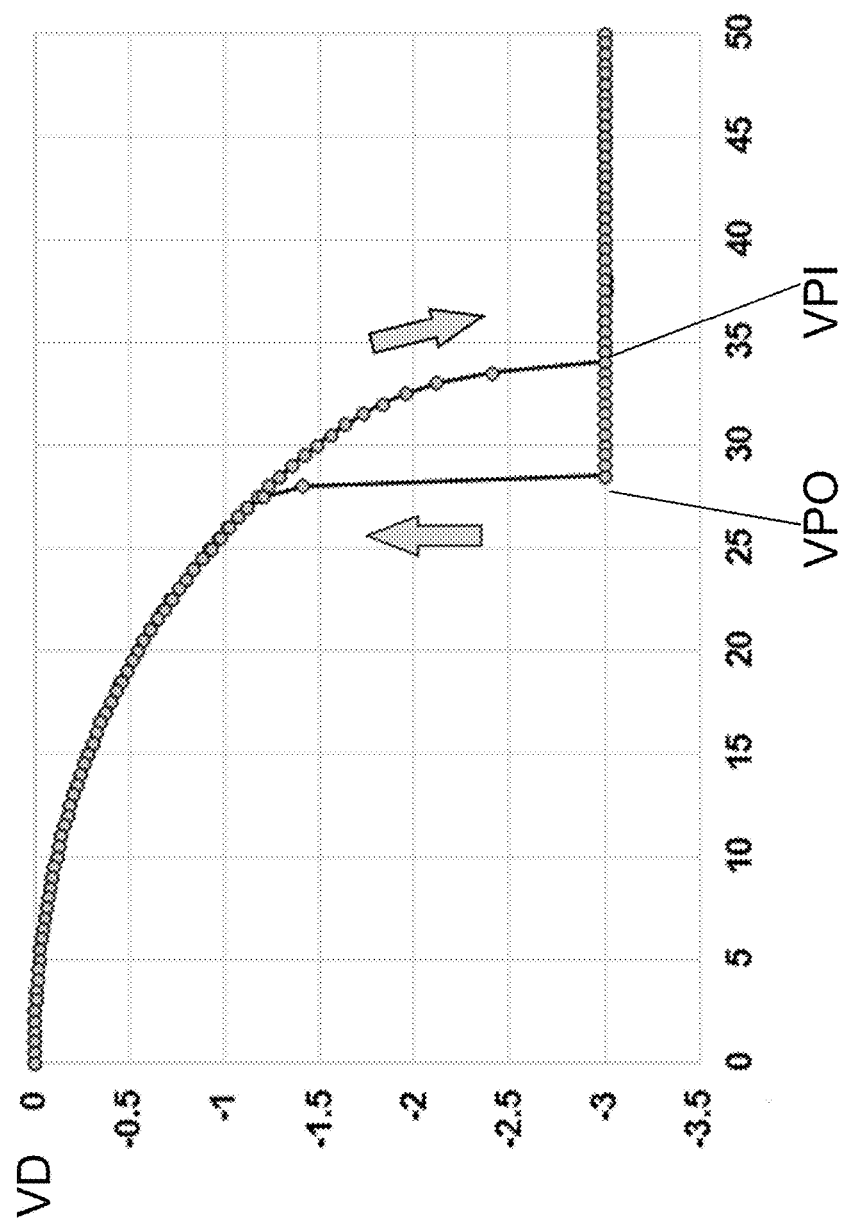
FIG. 9 shows a diagram of the vertical displacement VD vs. applied voltage of the typical pull-in/pull-out characteristic of the movable gold bridge device of the basic series and shunt attenuator modules.

More details are now provided on the RF-MEMS suspended membrane realizing the ON/OFF switching function, as shown in FIG. 8 (87) and FIG. 9 (97). The 3D schematic of the movable gold bridge is reported in FIG. 8.1, 8.2, (the dimensions in the following are given by way of an example only) and its in-plane dimensions are 170 μm by 500 μm. The structure is symmetric; starting from the peripheral anchoring areas 111 and moving towards the center, its composition is going to be briefly discussed. Three parallel flexible beams 112 (20 μm by 50 μm in-plane dimensions) are anchored on one end to the surrounding fixed gold frame 111, while are joined to the rest of the movable membrane on the other end. Two rectangular plates 113, 114 (170 µm by 130 µm in-plane dimensions) realize the electrostatic actuation driver, being them suspended above fixed poly-Si counter-electrodes lying beneath. Two slender beams 115, 116 (20 µm by 120 µm in-plane dimensions) connect the two actuation electrodes 113, 114 and cross the RF signal underpass (see FIGS. 8, 9), where contact areas are deployed right underneath such overpassing slender beams. When the RF-MEMS switch is actuated (pulled-in), the just mentioned slender beams establish an ohmic contact with the contact areas opened on the underneath RF signal line (underpasses 85, 95). In the case of series module, when the RF-MEMS switch is ON, the RF signal flows through the gold of the switch itself, indeed shorting the resistive in-line load. In the case of shunt module, when the MEMS switch is ON, the RF signal line is loaded, through the gold of the switch itself, with the two parallel resistors 94 placed in shunt configuration towards RF ground 96.

FIGS. 8.1, 8.2. report the RF-MEMS switch in two different actuation configurations. In FIG. 8.1 the applied DC voltage is equal to the pull-in threshold VPI. The membrane is deformed, and the central fingers (slender beams 115, 116) are touching the underneath contacts 88, 98 (switch ON), while the actuation electrodes 113, 114 are tilted downward, moving towards the center of the structure. In FIG. 8.2 the applied DC voltage is significantly higher than the pull-in threshold VPI. This means that a larger electrostatic force attracts the membranes (actuation electrodes 113, 114) towards the underlying surface. Consequently, the membrane surface laying on the bottom layer is larger, and the actuation electrodes "landed" on the substrate, as well. This can bring to a better ohmic behavior of the contact, due to the roughness of the surfaces in contact, reducing the contact resistance and, in turn, the RF signal losses.

An example of pull-in/pull-out characteristic of the RF-MEMS switch is reported in FIG. 9. The vertical displacement VD (µm) exhibits the snap-down (pull-in) VPI for a DC bias of around 34 V, and releases (pull-out) VPO when the bias steps below around 29 V. Coming back to the discussion of FIG. 8, having in mind the plot in FIG. 9, FIG. 8.1 corresponds to the point of the trace in FIG. 12 when the DC voltage is VPI. On the other hand, FIG. 8.2 corresponds to the point of the trace in FIG. 9 when the DC voltage is significantly larger than VPI. It must be highlighted that, from the point of view of the ON/OFF function realized by the RF-MEMS switch for the input/output RF signal, nothing changes in the two cases reported in FIG. 8.1 and FIG. 8.2.

Figure 10A:
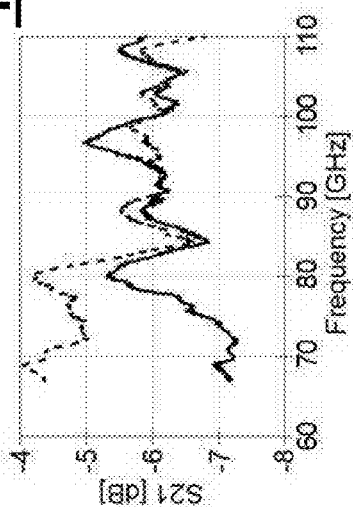
Figure 10B:
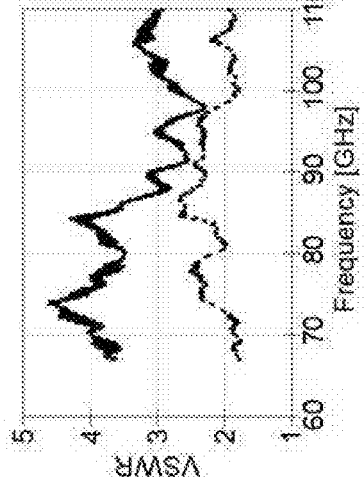
Figure 10C:
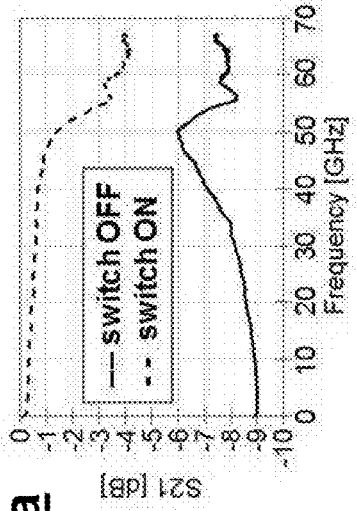
Figure 10D:
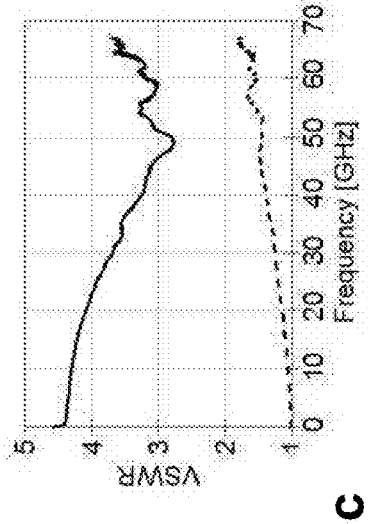

In FIG. 10, measured attenuation/loss (S21) and Voltage Standing Wave Ratio (VSWR) of the series/shunt RF-MEMS attenuator modules in the ON/OFF MEMS micro-relay states vs. frequency [GHz] are shown. From top-left to bottom-right:

FIG. 10a-10b) Attenuation (switch OFF) (S21) and loss (switch ON) (S21) of the series attenuator in the Low Frequency Range—LFR (a) (till 70 GHz) and High Frequency Range—HFR (b) (70-110 GHz);

FIG. 10c-10d) VSWR of the series attenuator in the LFR (c) and HFR (d);

FIG. 10e-10f) Loss (switch OFF) and attenuation (switch ON) of the shunt attenuator in the LFR (e) and HFR (f);

FIG. 10g-10h) VSWR of the shunt attenuator in the LFR (g) and HFR (h).

With reference to FIG. 10, tested devices show attenuation levels (S21) from −5 dB to −10 dB, depending on the resistive load, with flatness of 2-3 dB from 10 MHz to 50 GHz and of around 2 dB from 60 GHz up to 110 GHz. When OFF, the attenuator modules introduce loss (S21) better than −1 dB up to 50 GHz and better than −6 dB up to 110 GHz.

Leveraging on such basic elements, a more complex device is designed according to an aspect of the invention, manufactured and tested, in the RF-MEMS technology, i.e., a wideband 8-bit reconfigurable multi-state RF-MEMS power attenuator. The multi-state RF-MEMS attenuator is based on two fundamental components: 1) Series and shunt resistors integrated in the process; 2) Electrostatically controlled RF-MEMS ohmic switches. The latter ones select/deselect the former resistive loads, thus changing the overall resistance loading the RF line and, in turn, the level of attenuation.

Figure 11:
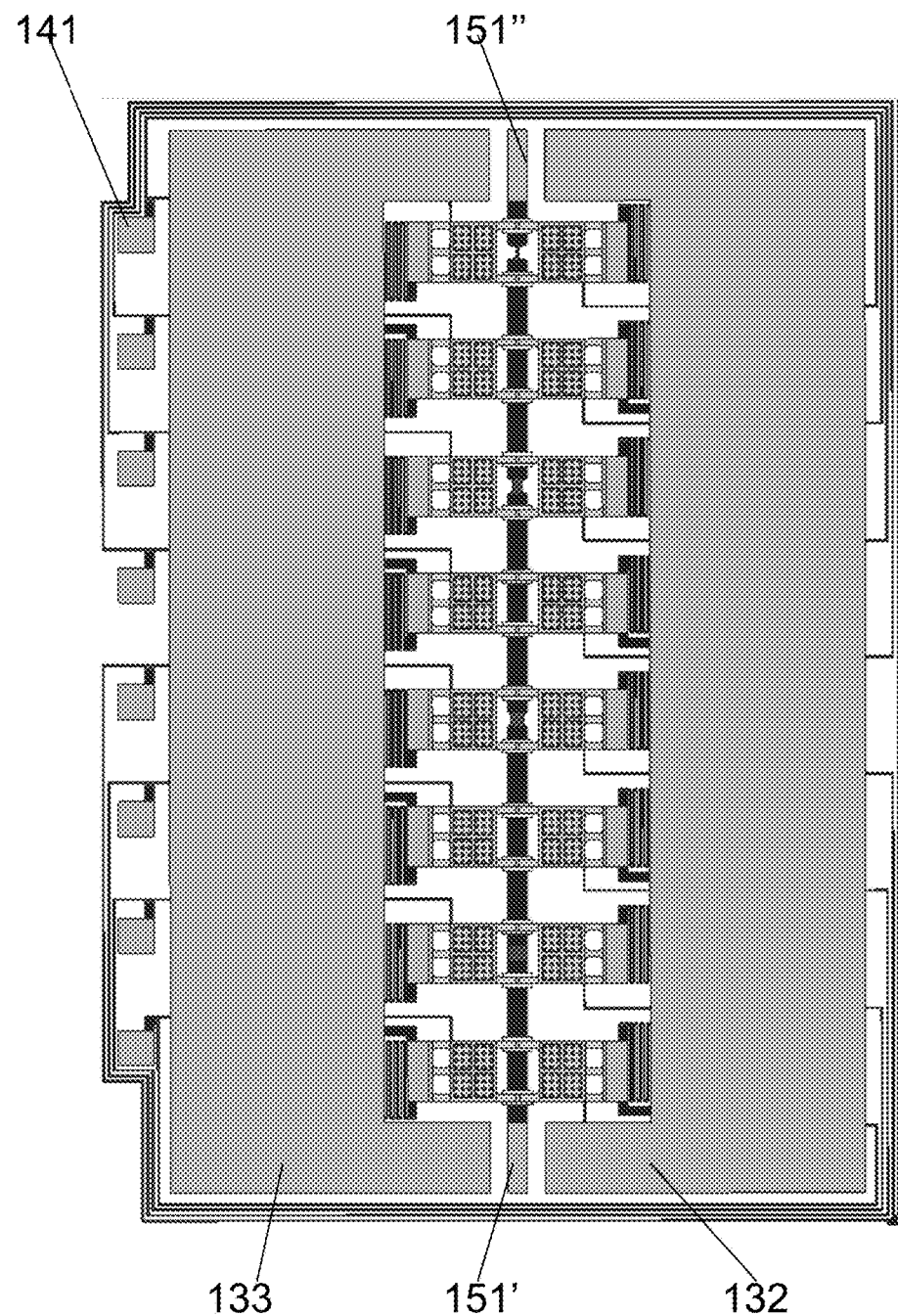
FIG. 11 shows a complete layout of an 8-bit reconfigurable multi-state RF power attenuator, as a further embodiment example of the invention, composed by a number of said basic series and shunt attenuator modules.
Figure 13:
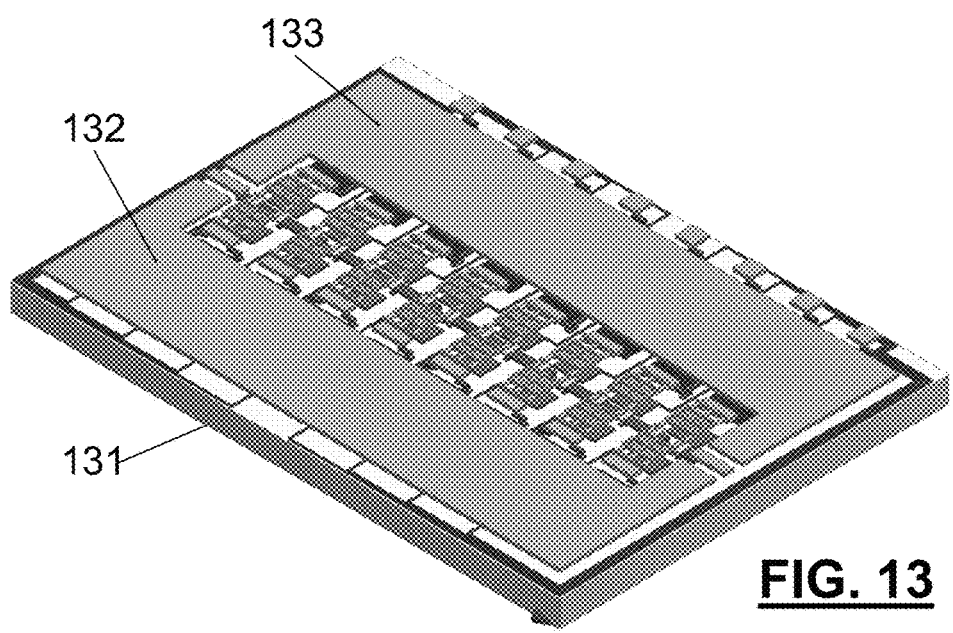
FIGS. 13 and 14 show respectively another complete layout of an 8-bit reconfigurable multi-state RF power attenuator, in perspective view, and an enlarged particular thereof.

More specifically, with reference to FIGS. 11 and 13, in this non-limiting example of embodiment, the device (footprint of 3 mm by 1.95 mm; total area smaller than 6 mm2) is based on the CPW configuration and features eight cascaded electrostatically actuated MEMS ohmic switches, independently controllable by applying a DC bias to the pads 141. The cascaded switches are connected in series between a common substrate 131 and two common RF ground planes 132, 133. The DC bias to the pads 141 select or short series Low Resistivity (LR) poly-Si resistors 84, as well as deselect or select shunt LR poly-Si resistors 94, depending if the micro-relay is in the rest position (OFF) or pulled-in (ON), respectively. The way the DC biasing control signals are brought to each single MEMS switching unit, is equivalent to the deploying of HR Poly-Si biasing electrodes and signal feeding lines, already shown for the RF-MEMS attenuator series basic module (82', 82) and shunt module (92', 92), respectively. Of course, in the case of FIG. 11 the DC biasing signals redistribution scheme from pads 141 to each single MEMS switch is more complex than in FIG. 5.4, 5.5 and FIG. 6.4, 6.5. However, the working principles are the same.

In other words, the network in FIG. 11 features four series attenuator modules alternated with four shunt attenuator modules, already described above as single standalone basic structures. In FIG. 12, the close-up of the bank of eight independent switching stages is reported in the top of figure, while the equivalent lumped element schematic is shown in the bottom of figure.

As visible in FIG. 12.1, the 8-bit complex attenuator in composed by 8 alternated shunt and series modules (from left to right), enabling 256 different configurations of attenuation levels. The working principle of the complex network is the same as already described above, for what concerns basic series and shunt 1-bit modules. The layout of the attenuation stages and of the RF-MEMS switches is the same already discussed before. The main difference stands in the fact that in the 8-bit device, a unique RF underpass central line 151 runs across the whole device and underneath the 8 switches, from the input 151' to the output 151" terminations, where vertical transitions bring the RF signal line to the upper gold level, i.e., where in/out CPWs are deployed, in order to allow Ground-Signal-Ground (GSG) connectivity of the RF-MEMS network to the external world.

Considering the lumped elements equivalent circuit of FIG. 12.2, the values of the various resistances R1-R8 (corresponding to the series resistances 84 and the shunt resistances 94, allowing the composition of the complex attenuator) can be different, according to the specific design needs, and realized by different form factor (i.e., different length and/or width) of the Poly-Si resistors.

It is evident that any other configuration of reconfigurable multi-state RF power attenuator is possible, by connecting together a given number of series and/or shunt basic attenuators described above, according to any specific design need. Based upon the number of cascaded basic attenuation elements, the cumulative number of programmable bits and, therefore, the overall number of different states/configurations the network implements, will vary.

It must also be noted that shunt and series attenuation modules not necessarily have to be alternated. Modified designs of RF-MEMS reconfigurable attenuators could be composed, for instance, exclusively by series module, by shunt modules, or might be composed by a different combination of them (e.g., 2 cascaded series modules followed by 3 cascaded shunt modules, and so on).

Furthermore, the deployment scheme of the loading resistor/s per each attenuation module, could be modified, as well. For example, rather than having a unique series resistor (as in the case of the series module shown in FIG. 7.1) or a unique equivalent resistor connected to RF ground (as in the case of the shunt module shown in FIG. 7.2), the loading resistors that attenuate the RF signal, could be networked together, according to schemes that are well-known in literature, like, for instance, the "T" and the "Π" configurations.

Figure 14:
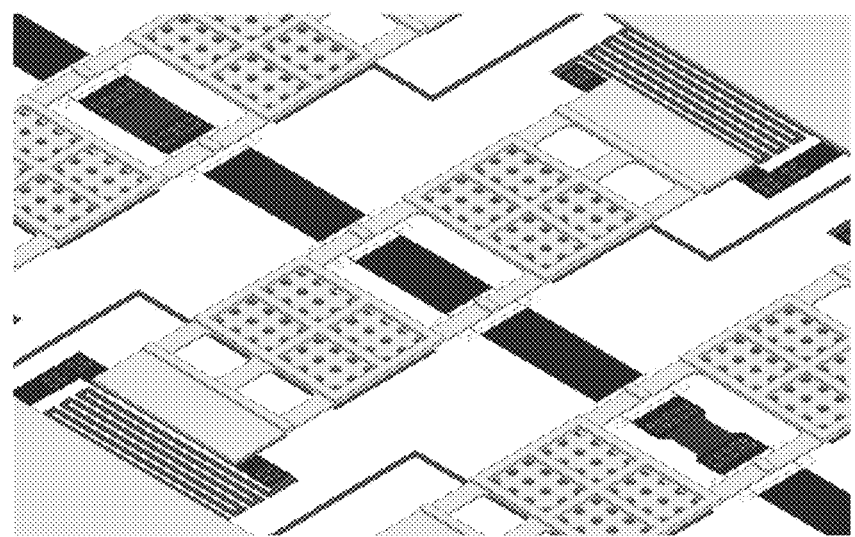

FIG. 13 shows the 3D schematic of the whole 8-bit network described above. FIG. 14 shows the close-up of a single attenuator element belonging to the network.

Concerning the RF performance of 8-bit RF-MEMS attenuator tested physical samples, the network exhibits several attenuation levels in the range of −10/−45 dB that are rather flat up to 50 GHz, and a certain number of configurations with Voltage Standing Wave Ratio (VSWR) smaller than 4 from nearly-DC up to 110 GHz, and better than 2 on a frequency span of about 80 GHz.

Considering both the single RF-MEMS attenuator modules (series/shunt) and the 8-bit complex network, the physical devices exhibit good performance in attenuating electromagnetic signals that span on a very-broad frequency range, starting from DC/nearly-DC signals, rising to Radio Frequency (RF), Microwave (MW) and millimeter-wave (mm-Wave) spectra. In addition to this consideration, it must be noted that the experimental characteristics here reported are referred to the frequency span from DC to 110 GHz, because the laboratory equipment exploited for the S-parameters characterization was limited to such a range. This means that the RF-MEMS attenuators (both single series/shunt modules and 8-bit network) very likely are able to exhibit good characteristics also above 110 GHz. In particular, given the dimensions of the devices, the 8-bit RF-MEMS attenuator is expected to score good performance up to 150-160 GHz. On the other hand, the single series/shunt modules, being smaller, are expected to provide good performance up to 200-220 GHz.

Therefore in the framework of the field of application of the present invention, the RF signal has to be intended as widened to a definition of an electromagnetic signal.

As far as the application contexts in which the RF-MEMS power attenuation solutions described above (both concerning basic 1-bit modules and more complex implementations) can find employment, some of them are briefly described here below, with reference to some non-limiting embodiment examples.

The upcoming 5G standard (5th Generation of mobile communications) will bring a revolution in the current concept of mobile services and communications. The amount of data to be transmitted/received will dramatically increase, compared to the nowadays trends, and the hardware will have to work in higher frequency ranges (e.g., 60 GHz and above). This means that RF passives will have to exhibit pronounced wideband operability, large reconfigurability and very-high performance, in order to comply with the requirements of 5G.

Among the various upgrades at infrastructure level, 5G will bring to capillary coverage of wireless services in urban environments (e.g., buildings, public places, and so on). To do so, smart cell radio units, with limited coverage in terms of space, will be deployed nearly everywhere in these scenarios. For example FIG. 15 shows a schematic view of the distribution of smart cell radio units, as required by 5G, in an urban scenario.

Figure 15:
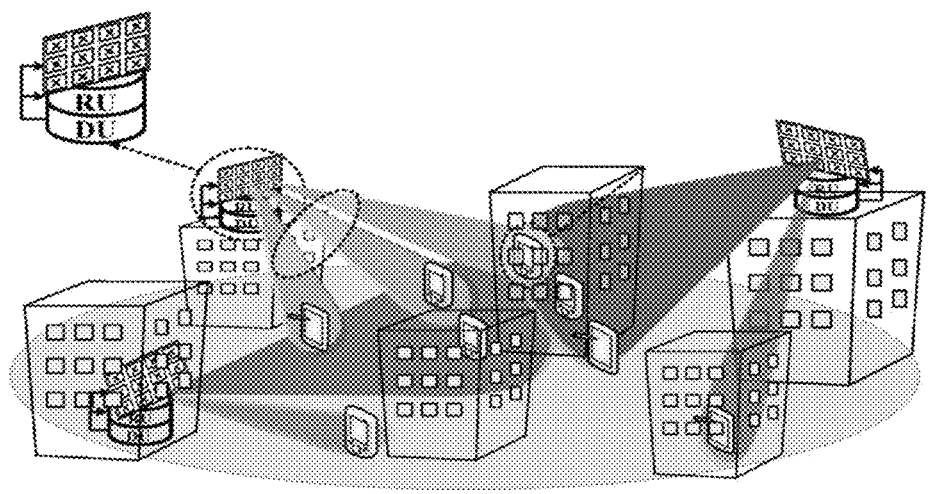
FIG. 15 shows a schematic view of the distribution of smart cell radio units in an environment in which the devices according to the invention can be used.

In the framework of telecommunication apparatus, the smart cell radio units reported in FIG. 15, require very demanding performance in terms of spatial 3D beamforming, to be achieved through arrays of small antennas, fed by baseband digital beamforming circuits 162 (known per se), RF chain amplifiers 163 (known per se), and driven, one by one, through cascaded phase shifters 164 and attenuators 165 working in combination, meant to de-phase and balance the intensity of the signal flowing to each single antenna, in order to achieve optimal directivity/shaping of the beam. For example FIG. 16 shows a schematic of 3D hybrid beamforming structure, necessary to enable 5G smart cell radio units.

Figure 16:
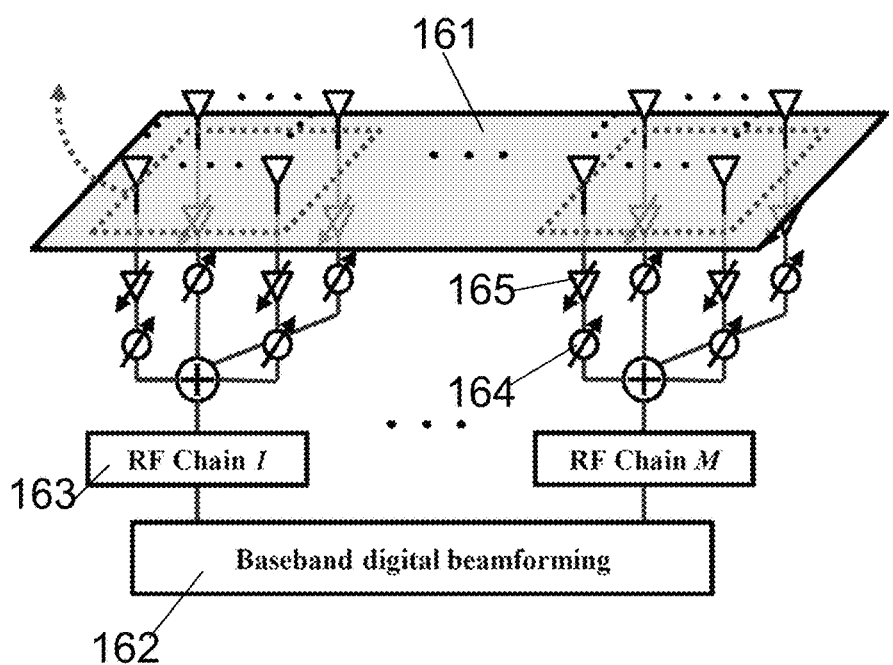
FIG. 16 shows a schematic of a 3D hybrid beamforming structure, necessary to enable 5G smart cell radio units, comprising output stages in which the devices according to the invention can be included.

All the programmable attenuators of FIG. 16 can be implemented relaying on the RF-MEMS solution described above. Moreover, the functionality of RF attenuation and phase shifting, might be integrated in the same RF-MEMS device, thus reducing losses, hardware complexity, integration issues, power consumption, area consumption and costs.

Furthermore, the widespread of radio and wireless systems, from mobile communications, to remote sensing/control, again to data transmission (e.g., Internet/WiFi), requires the employment of a huge amount of RF/microwave components, systems and sub-systems, like, for instance, filters, transceivers, Power Amplifiers (PAs), multiplexers, and so on. A very challenging task, for producers, manufacturers and suppliers of such components, is the testing and qualification of their products. Since the amount of components is very large, the testing phase follows, since decades, a seamless trend towards automation. The whole equipment and appliance needed for the testing of RF/microwave components, is known and identified as Automatic/Automated Test Equipment (ATE).

Among the wide variety of testing devices necessary to perform ATE, the Vector Network Analyzer (VNA), also referred to as Programmable Network Analyzer (PNA), is one of the most commonly used. The VNA enables the measurement of the Scattering parameters (S-parameters), both of passive and active devices, with a number of terminals (i.e., ports) that ranges from 1, to 2, 3, 4 and more. The S-parameters make possible assessing the most critical characteristics of RF and microwave components and systems, like, for instance, losses, isolation, gain, operation bandwidth, cross-talk, resonance, quality factor (Q-factor), parasitic effects, linearity, and so on.

Figure 17:
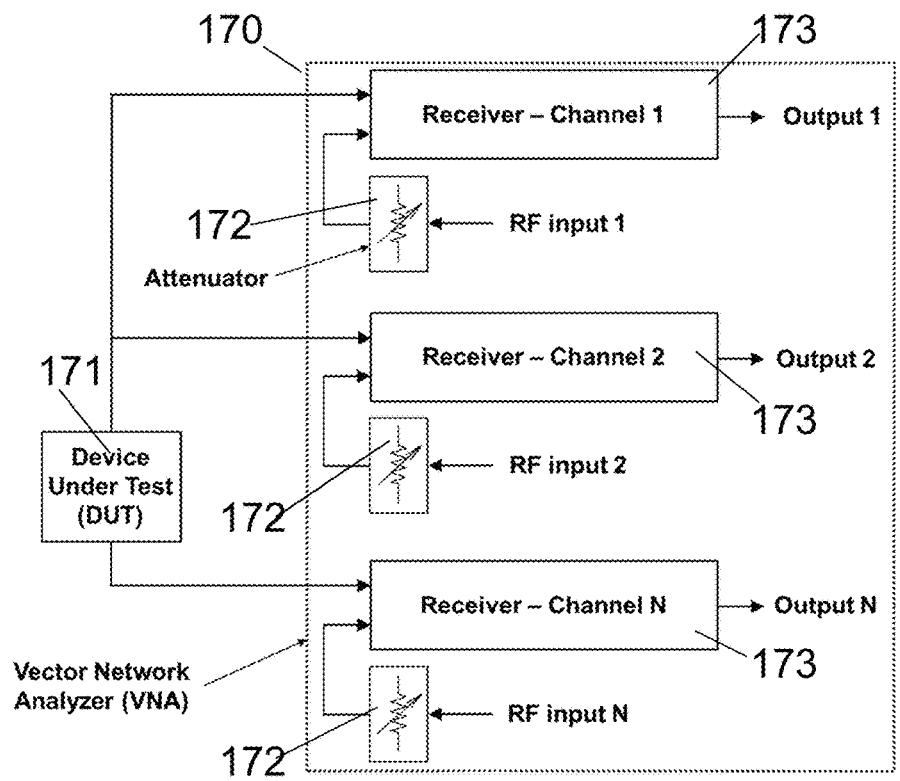
FIG. 17 shows a schematic block diagram of a Vector Network Analyzer (VNA) in which the devices according to the invention can be included.

A typical schematic block diagram of a VNA 170 is reported in FIG. 17, for automated testing of RF/microwave Devices Under Test (DUTs) 171. Reconfigurable power attenuators are inserted in the test port blocks). It refers to a multiple N-port device, suitable to test a Device Under Test (DUT) 171 with more input/output terminals. As visible, each terminal stage of the VNA (i.e., between the DUT 171 and the receivers 173) employs a programmable attenuator 172, necessary to adjust the power level to the most suitable one for the receiver. Such attenuators can be replaced with the technology solutions described above, leading to better performance of the VNA, in terms of losses, wideband operability, reconfigurability and adaptivity.

Still referring to the case of VNAs, another promising exploitation of the RF-MEMS-based attenuator concept discussed in this document, is envisaged. In the characterization techniques of several components, like, for instance PAs and filters, it is often necessary to connect an attenuator between the DUT and the VNA, in order to establish optimal measurement conditions. This is typically done by using discrete attenuators, i.e., additional components, to be connected in the measurement chain, i.e., between its output power and the VNA input.

The availability of miniaturized, high-performance and, on top of all, widely reconfigurable attenuators, like the one described above, make it possible embodying such a functionality directly within the input stage of the VNA. Such a solution, would significantly speed-up the VNA-based characterization process, as it would not be necessary anymore connecting and disconnecting an additional external attenuator. This integrated solution can be particularly beneficial when several different DUTs have to be characterized in a row, with each of them requiring ad-hoc settings for the measurement chain.

Figure 18:
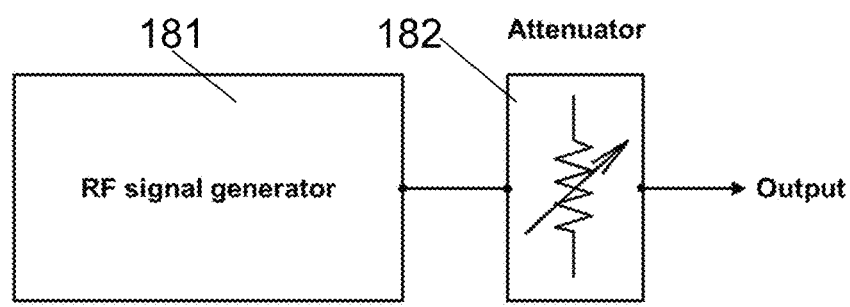
FIG. 18 shows a schematic block diagram of an RF signal generator in which the devices according to the invention can be included.

Furthermore, any radio and/or wireless system, ranging from mobile phones and smartphones, to base stations and infrastructures for mobile communications, again to data transmission systems (Internet), television signals broadcasting, and so on, features one or more RF signal generator/s. Signal generators are necessary to synthesize a reference frequency, with very good accuracy and stability, that is then necessary for handling the data/information to be transmitted and/or received (e.g., through various modulation, encoding and mixing techniques). Each signal generator, regardless of it is working in the traditional radio, RF or microwave/millimeter frequency band, always features a reconfigurable attenuator as last block before the output, which is necessary to stabilize and adjust the amplitude of the signal to be delivered to the following stages of the systems. FIG. 18 shows a schematic block diagram of an RF signal generator 181. The attenuator stage 182 at the end of the signal generator chain, can be implemented by the RF-MEMS attenuators described above. This leads to better performance, in terms of wideband operability, compactness, reconfigurability and usage adaptivity of the overall generator.

After having reported all the previous cases, it is straightforward that the RF-MEMS miniaturized solution described above to implement reconfigurable wideband attenuators, can be exploited also to realize standalone attenuators, i.e., discrete components to be employed in a variety of different applications. Nowadays, all the commercially available RF power attenuators are rather bulky and expensive, have a limited number of configurations, and, most of all, do not work on a very wide range of frequencies, and, in any case, not above 40-50 GHz. The RF-MEMS solutions here described lead to very compact discrete components, able to implement plenty of configurations, and to work from DC up to 110 GHz.

Obviously the experts in the field could find many variations to the embodiment herein described, still within the scope of the present invention.

The elements and characteristics described in the various forms of preferred embodiments can be mutually combined without departing from the scope of the invention.

Further implementation details will not be described, as the man skilled in the art is able to carry out the invention starting from the teaching of the above description.

What is claimed is:

1. A wideband power attenuator in RF-MEMS multilayer technology, for attenuating an electromagnetic signal, comprising:
   an upper layer with two RF ground planes, and between said two RF ground planes a central RF-MEMS movable switch as a floating electrode, an RF input, an RF output of an RF line running across the attenuator,
   a number of lower layers comprising in sequence:
     a ground floor of an electrically insulating substrate,
     two DC biasing electrodes to electrostatically control said movable switch, and DC biasing lines to feed the DC biasing electrodes;
     two DC-RF decoupling resistors, each decoupling resistor being connected on one side to respective terminals of said movable switch, and on the other side to respective one of the two RF ground planes;
     a resistive load adapted to be connected to the RF line to attenuate the electromagnetic signal on the basis of the floating movable switch configuration, between a non-contact RF position and a contact RF position with said RF line.

2. The wideband power attenuator in RF-MEMS multilayer technology, as in claim 1, wherein said resistive load is adapted to perform as a series attenuator, to be connected in series between said RF input and said RF output when said movable switch is in said non-contact RF position, and to be bypassed when said movable switch is in said contact RF position, said movable switch performing as RF bypass.

3. The wideband power attenuator in RF-MEMS multilayer technology, as in claim 1, wherein said resistive load is adapted to perform as a shunt attenuator, to be connected between said RF ground plane and said RF line, shunt to ground, when said movable switch is in said contact RF position, and to be disconnected when said movable switch is in said non-contact RF position.

4. The wideband power attenuator in RF-MEMS multilayer technology, as in claim 3, wherein said resistive load comprises two resistances connected between respective ones of said two RF ground planes and to said RF line when said movable switch is in said contact RF position.

5. The wideband power attenuator in RF-MEMS multilayer technology, as in claim 1, wherein said movable switch comprises, as a symmetric structure:
   said terminals, as anchoring areas connected to said DC-RF decoupling resistors;
   two plates, as electrostatic actuation drivers, respectively connected to said terminals through flexible beams;
   two central slender beams connected to said rectangular shaped plates, said slender beams performing as said connection to the RF line when the movable switch is actuated by said DC biasing electrodes, the actuation of the movable switch in the connected position being made by a DC voltage applied to said DC biasing electrodes, at least equal to a pull-in threshold value.

6. The wideband power attenuator in RF-MEMS multilayer technology, as in claim 1, wherein said DC-RF decoupling resistors 83, 93 are serpentine-shaped lines.

7. The wideband power attenuator in RF-MEMS multilayer technology, as in claim 1, wherein the range of working frequencies is from DC to 110 GHz.

8. A wideband reconfigurable programmable multi-state power attenuator in the RF-MEMS multilayer technology, comprising more than one wideband power attenuator in RF-MEMS multilayer technology as in claim 1, wherein said more than one wideband power attenuator in RF-MEMS multilayer technology are cascaded above a common substrate, between an RF input and an RF output terminal, framed among two common RF ground planes, and individually actuated over a unique RF underpass central line by respective ones of said DC biasing electrodes.

9. A wideband reconfigurable programmable multi-state power attenuator in the RF-MEMS multilayer technology, as in claim 8, wherein the range of working frequencies is from DC to 110 GHz.

10. A telecommunication apparatus, comprising at least one antenna driven by cascaded phase shifters and attenuators, wherein at least one of said attenuators is a wideband reconfigurable programmable multi-state power attenuator in the RF-MEMS multilayer technology as in claim 8.

* * * * *